United States Patent
Mahajan et al.

(10) Patent No.: US 12,100,180 B2
(45) Date of Patent: Sep. 24, 2024

(54) AUTOMATED TUNING AND CALIBRATION OF A COMPUTER VISION SYSTEM

(71) Applicant: Griffyn Robotech Pvt. Ltd., Alpharetta, GA (US)

(72) Inventors: Amit Anil Mahajan, Alpharetta, GA (US); Samir Shriram Bagalkote, Pune (IN)

( * ) Notice: Subject to any disclaimer, the term of this patent is extended or adjusted under 35 U.S.C. 154(b) by 0 days.

(21) Appl. No.: 17/486,814

(22) Filed: Sep. 27, 2021

(65) Prior Publication Data

US 2022/0101558 A1 Mar. 31, 2022

Related U.S. Application Data

(60) Provisional application No. 63/084,049, filed on Sep. 28, 2020.

(51) Int. Cl.
*G06T 7/80* (2017.01)
*G05B 13/02* (2006.01)
*G06T 7/00* (2017.01)
*G06T 7/40* (2017.01)
*G06T 7/521* (2017.01)
(Continued)

(52) U.S. Cl.
CPC .............. *G06T 7/80* (2017.01); *G05B 13/027* (2013.01); *G06T 7/0004* (2013.01); *G06T 7/40* (2013.01); *G06T 7/521* (2017.01); *G06T 7/70* (2017.01); *H04N 23/56* (2023.01); *H04N 23/64* (2023.01); *G06T 2207/10028* (2013.01); *G06T 2207/20081* (2013.01); *G06T 2207/20084* (2013.01); *G06T 2207/30108* (2013.01); *G06T 2207/30244* (2013.01)

(58) Field of Classification Search
CPC ........... G06T 7/80; G06T 7/0004; G06T 7/40; G06T 7/521; G06T 7/70; G06T 2207/10028; G06T 2207/20081; G06T 2207/20084; G06T 2207/30108; G06T 2207/30121; G06T 2207/30244; G06T 7/001; G05B 13/027; H04N 5/2256; H04N 5/23222; H04N 5/232; G01B 11/002; G01B 11/022; G01B 11/22; G01B 21/042
See application file for complete search history.

(56) References Cited

U.S. PATENT DOCUMENTS

| | | | | |
|---|---|---|---|---|
| 10,791,310 B2 * | 9/2020 | Nikkanen | ................ | G06N 3/08 |
| 11,012,683 B1 * | 5/2021 | Beach | ...................... | G06N 3/08 |

(Continued)

FOREIGN PATENT DOCUMENTS

WO   WO-2020205655 A1 *  10/2020  .......... B60W 30/182

*Primary Examiner* — Richard A Hansell, Jr.
(74) *Attorney, Agent, or Firm* — The Phoenix Group

(57) ABSTRACT

A system and method for autocalibration of the camera and lighting components of an inspection and cosmetic grading machine is provided. Camera and lighting assemblies capture images of an object and create a 2D composite image which is processed by an image processing module with a deep learning machine algorithm to detect surface defects in the object and may measure the depth associated with light intensity. Precisely calibrated lights and vision system are required. Over time, environmental factors and component vibration and movement dislocate the components causing both lighting and camera anomalies. Automated systems are proposed that allow automated calibration of these systems without human intervention.

2 Claims, 24 Drawing Sheets

(51) Int. Cl.
    *G06T 7/70*           (2017.01)
    *H04N 23/56*       (2023.01)
    *H04N 23/60*       (2023.01)

(56) References Cited

U.S. PATENT DOCUMENTS

| | | | |
|---|---|---|---|
| 2011/0103679 A1* | 5/2011 | Campbell | G01N 21/8806 |
| | | | 382/152 |
| 2012/0320190 A1* | 12/2012 | Natroshvili | G06T 5/80 |
| | | | 348/135 |
| 2016/0071023 A1* | 3/2016 | Eicher | G06N 5/025 |
| | | | 706/12 |
| 2019/0108651 A1* | 4/2019 | Gu | G06V 10/955 |

\* cited by examiner

AUTOMATED TUNING AND CALIBRATION OF A COMPUTER VISION SYSTEM

RELATED APPLICATIONS

This patent application claims the benefit of U.S. Provisional patent application No. 63/084,049, filed Sep. 28, 2020 entitled "AUTOCALIBRATION FOR COSMETIC GRADING MACHINE" which is incorporated herein by reference in its entirety and for all purposes. A claim of priority is made.

SUMMARY

The presently disclosed technology relates generally to an improved system, method and device for the calibration of a computer vision system.

Computer vision systems have many uses and come in many forms and are built for many purposes. Industrial machine vision such as that used in a preferred embodiment of the type of system and method described herein, usually provides the most effective and economical solutions to solve many automation inspection and quality control problems in production environments. Surface defect inspection is one of the critical quality control aspects in many industries. Due to the complex nature of surface defects and variety of surface finishes, texture and color, the inspection process can be error prone and more subjective than desired. One type of surface inspection machine is a cosmetic grading machine which is an intelligent three-dimensional industrial machine vision system for cosmetic inspection and grading of smart display devices like smartphones and tablets. In order to achieve accurate and repeatable objective grading an automated vision inspection calibration system can play a greater role in solving the limitations associated with manual processes.

The performance of the industrial computer vision system relies on its robustness. The robustness in this context is more than just reliability. It is a reliability that is maintained within the natural variations of the environment in which the system is being used and how quickly it can be recalibrated and reset to achieve its desired performance. What is needed is an automated system and method for tuning and calibrating the various components of a computer vision system, including the lights, camera, and other components that may be present and subject to environmental or machine factors that may shift or displace calibration through normal use.

In order to present various embodiments of a automated tuning and calibration of a computer vision system in context, the specification describes a cosmetic grading machine of the type patented by Griffyn Robotech Pvt. Ltd., under U.S. Pat. No. 10,753,882, titled Inspection and Cosmetic Grading through Image Processing System and Method. However, this description is merely to set the context for the use of an automated system of the type claimed herein, as it is usable in any type of computer vision system.

Some embodiments may configure the system components in alternative ways in order to accommodate the evaluation of objects of different sizes, materials, and other properties.

The features, functions and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

The accompanying drawings, which are included to provide a further understanding of the disclosed embodiments and are incorporated in and constitute a part of this specification, illustrate exemplary embodiments and together with the description serve to explain the principles of the disclosed embodiments.

DETAILED DESCRIPTION

Figure 1:
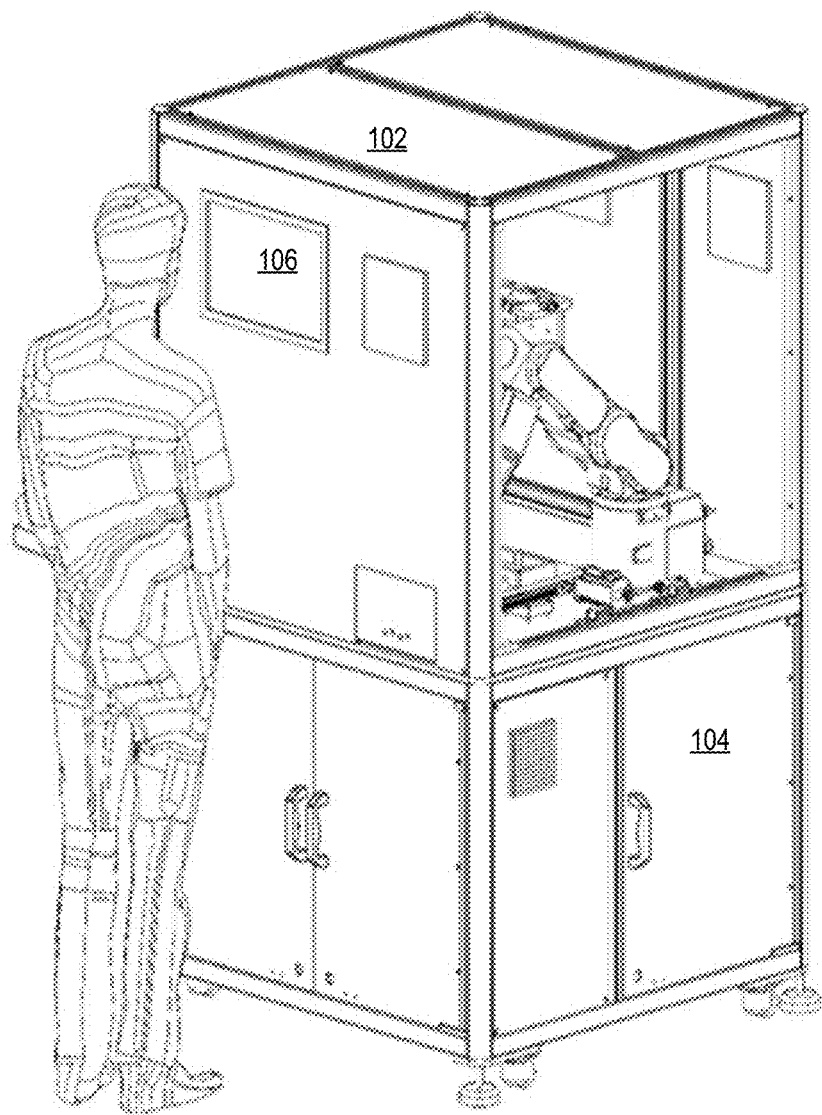
FIG. 1 illustrates a standalone system for inspecting small objects or items consistent with this disclosure.

Embodiments of the claimed subject matter will now be described more fully with reference to the accompanying drawings, in which some, but not all embodiments are shown. The subject matter disclosed may be embodied in many different forms and should not be construed as limited to the embodiments set forth herein; rather, these embodiments are provided so that the disclosure may satisfy legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." The terms "objects", "product" and "items" are used synonymously and interchangeably in this disclosure. A "customer" may be an individual or organization requesting the services of a system and method consistent with this disclosure. A "user" may be the operator of such a system. It should also be understood that while some embodiments describe the methods or products as comprising one or more elements, the methods or elements may also consist of or consist essentially of the elements disclosed herein. The terms "inspection" and "evaluation" are used interchangeably and synonymously in this disclosure.

An inspection and cosmetic grading system and method may evaluate the surface of an object for defects. The term "surface" as used herein refers to the outside part or uppermost layer or layers of an object, with a depth of at least the depth of a defect, but with no maximum or minimum limits on the depth of the "surface." The surface may include multiple layers of the same or different material(s). The depth of a surface is defined specifically for each object being evaluated. For example, an iPhone 6 mobile device screen consists of at least 8 layers of material. If a defect cuts through all 8 layers and into the device below, all the layers of the screen and the device below may be considered the surface for the purposes of this disclosure.

Overview of a Preferred Embodiment of a Cosmetic Grading Device

As was mentioned above, the cosmetic grading system described herein is provided to give context to the various embodiments of an automated tuning and calibration system and method for a computer vision system. However, the automated tuning and calibration system described and claimed may be used on any type of computer vision system. An inspection and cosmetic grading machine as disclosed herein may comprise four modular subsystems: an image capturing subsystem, image processing module, object/material handling module, and depth sensing unit. Image capture apparatus includes modular hardware components, such as camera (lens, image sensor), lighting modules and processors that may be interchanged for evaluating products of different sizes, materials and expected size and type of surface defect. Together, an image capture subsystem and image processing module comprise the major components of a machine vision system. Machine vision systems create images by analyzing the light reflected from an object. Lighting techniques (e.g. back lighting, axial diffuse lighting, dark field illumination, bright field illumination, etc.) comprise a light source and its placement with respect to the object and the camera. Choice of lighting techniques also depends on the object being evaluated and the goals of the evaluation.

An image processing module may involve the use of a processor and memory, with computer-executable instructions which when executed by the processor extract information from an image. Image processing algorithms may acquire information from the camera, pre-process the image for optimization and ensure that the desired features are conspicuous. An algorithm may be designed to locate the specific features that are the subject of the analysis, run measurements and make comparisons. An image processing system may incorporate machine learning and deep learning algorithms to make the comparisons. Trained machine learning and deep learning systems can quickly and accurately identify the type of surface defects consistent with those described herein.

An object conveyance or handling module may comprise hardware to attach to, or grip, the object in order to position the object in front of the image capturing subsystem in various positions and orientations, either under its own programming or under the direction of feedback from the machine vision or other component. Object handling systems may be any kind of robotic assembly, hard automation or mechanical apparatus suited for a system consistent with this disclosure and the object being evaluated. Robotic assemblies may use any type of effector, for example, a claw, or one or more types of gripper effector such as magnetic, vacuum, slide or other type of gripper depending on the object to be evaluated.

In preferred embodiments, an advanced optical sensor provides depth measurement for detected defects. An advanced optical sensor may measure displacement from a plane using a sensor comprised of a set of lenses and light, sending a signal to a sensor controller which calculates the depth measurement.

In some embodiments the system may further comprise logic programmed to apply a customer's cosmetic grade level or category to an evaluated object. Cosmetic grading categories may be created for objects depending on many factors, including the type of object, the presence of defects, number and/or type of defects or damage to the object, and the ability to repair the item or replace parts within a certain cost or capability range. The rules logic may also provide a dispositional path (e.g. send to salvage, send for repair of screen, send for repair of casing, etc.) for the object. In an embodiment consistent with this disclosure, defects or damage present in and on surfaces may be assessed and the length, width and depth measured. Attributes of defects on an object may determine the cosmetic grade and/or which of several dispositional paths the object may take. Some industries publish standards for the cosmetic grading of an item in order to ensure consistency across products going to secondary markets. For example, the CTIA™, an organization supporting the wireless industry, sets standards for wireless device grading scales which allow any seller in any secondary market of devices to universally identify cosmetic condition and other graded features. The logic for grading rules and categories that support a customer's needs may be programmed into a system and method consistent with this disclosure, either as an internal component or a combination of internal/external with an integration to an external system using application programming interfaces (APIs) or other data transfer method known to those of ordinary skill in the art.

In various embodiments described herein, the cosmetic condition of an object surface may be assessed. Examples of smaller objects suitable for this system and method may include mobile phones, watches or other wearables, monitors, television screens, touch screens for medical devices, laptops, tablets, e-readers, portable gaming devices, GPS units, and many more. Surfaces may be comprised of glass, gorilla glass, CRT, LCD, plasma, OELD, plastic, silicone and/or other polymeric materials, as well as many combinations of materials. Embodiments of the system and method are contemplated for objects of all sizes and may be realized by alternative placement of hardware components.

FIG. 1 illustrates a standalone system 100 for inspecting small objects or items consistent with this disclosure. In this disclosure, terms related to the "size" of objects may be considered relative terms, with a small system sized to handle small items, a large system sized for larger items, a very large system sized to handle very large items, etc. In other words, the system and method may be practiced on "small" items, such as watches, mobile phones, tablets, small television screens, etc. in a system sized for small items; "larger" items, such as a large screen TV in a system sized for larger items, and "very large" items, such as a car, in a system sized for very large items. Regardless of the size of a system, the components remain the same, but may be placed in different configurations and with alternative uses made of some components, but all fall within the embodiments as described herein.

Referring again to FIG. 1, an inspection and cosmetic grading assembly 100 which may be appropriate for small objects or devices may be comprised of an enclosure 102 housing the system components. The enclosure may be constructed of an opaque, non-reflective material. An enclosure around the assembly allows the highest quality images to be created by the system and may act as a safety barrier for the system and serve to prevent dust and other debris from accumulating on object or component surfaces. A control cabinet 104 may be included to contain servers, controllers, motors, cables, and other system hardware that may be located in close proximity to their respective components. A computing device 106 with access to the graphical user interface to the system's control software, may be mounted on the enclosure for a user to provide input, observe images or processing screens, or override or otherwise control the system, if desired.

Figure 2:
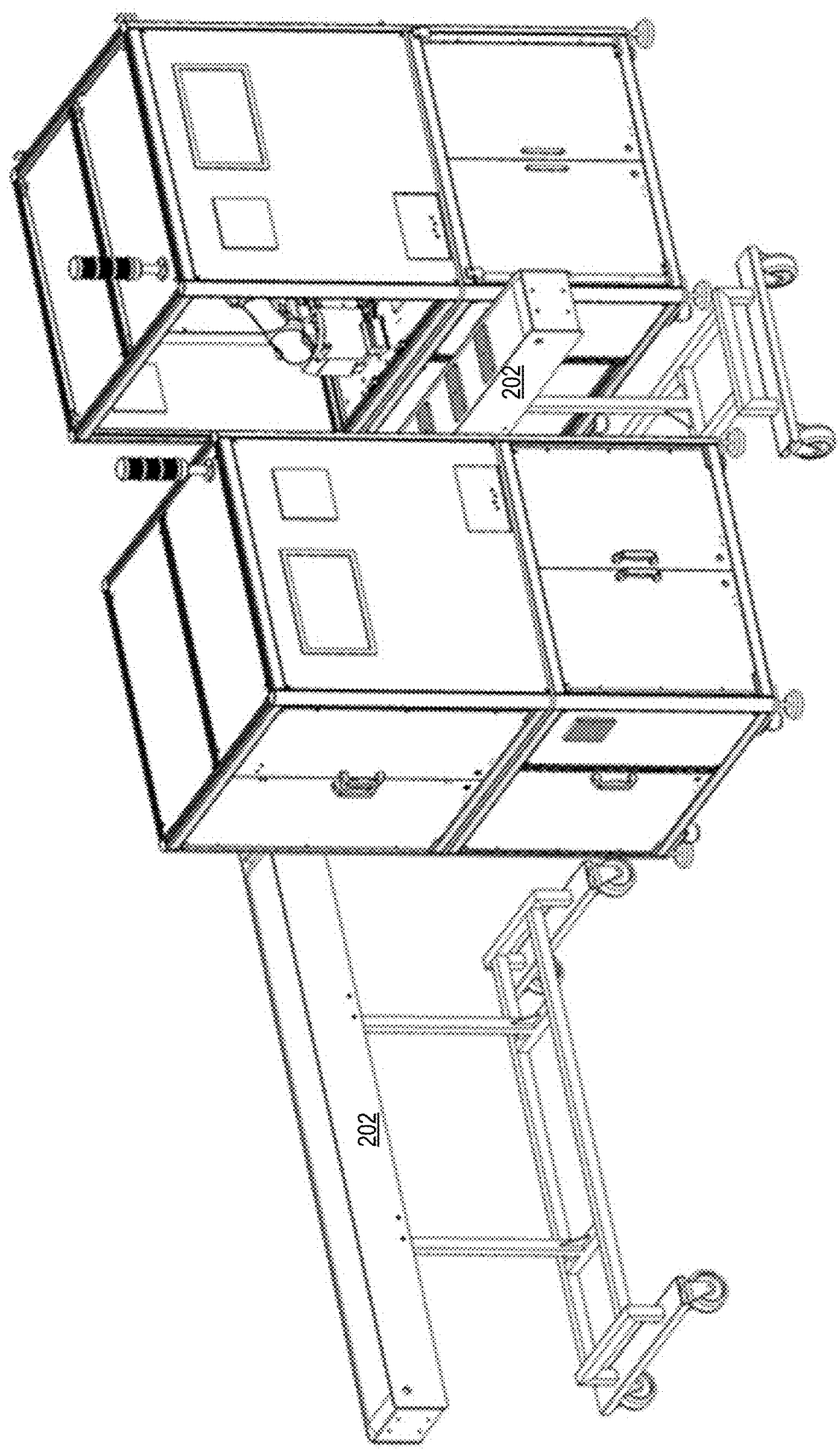
FIG. 2 illustrates a pair of standalone systems with a conveyor apparatus.

FIG. 2 illustrates a set of inspection and cosmetic grading units 100 with an external conveyance system 202 which transports an object to a unit for evaluation. A conveyance system may comprise frames supporting rollers, wheels or belts and may be motor powered or manual devices.

Figure 3:
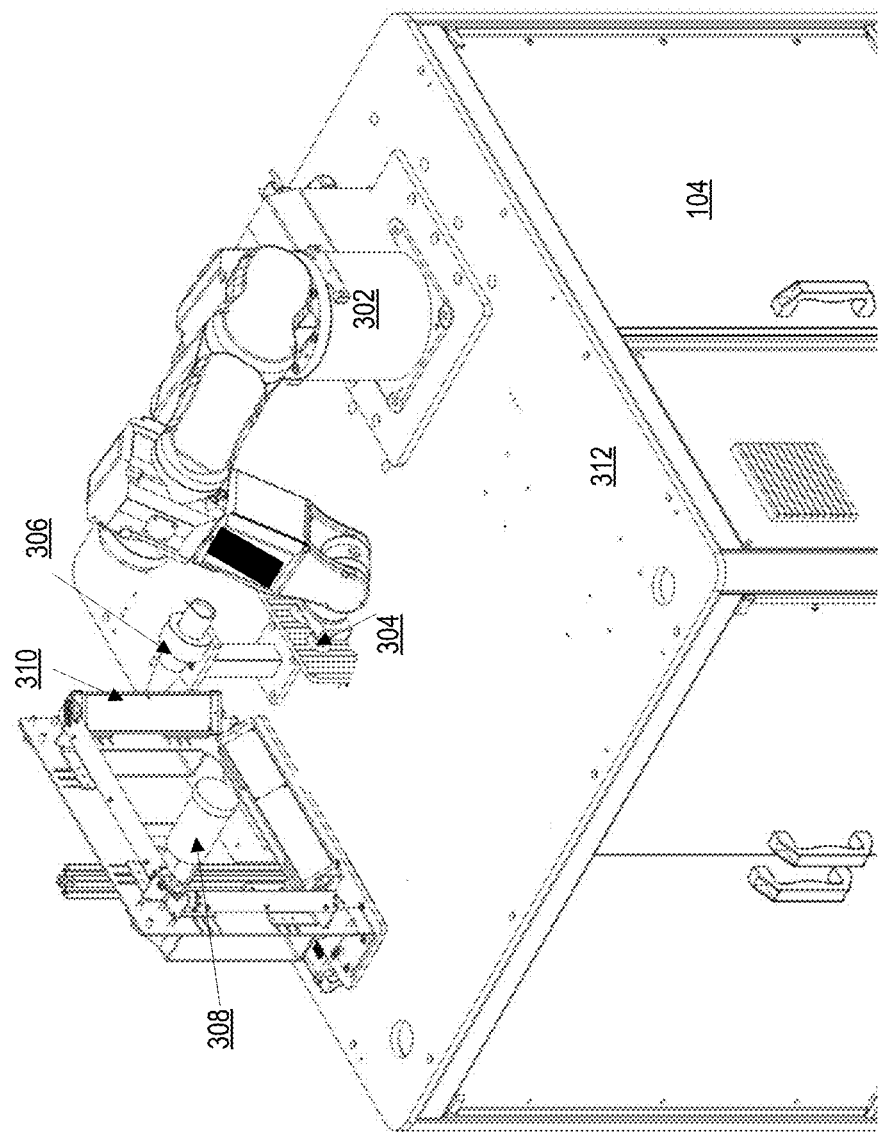
FIG. 3 illustrates the system's primary hardware components.

Referring now to FIG. 3, the system's primary hardware components may reside within the enclosure. Primary hardware components may comprise: an automated object control system (here, a robotic arm 302) with mounting and gripping device 304, an optical sensor 306, a plurality of cameras 308, and light assemblies 310 (light mountings, lights, light adjustment slide).

A base plate 312 may provide a mounting area for the system components. An automated object control system 302 may be equipped with various effectors and used for various purposes in an inspection and cosmetic grading system and method. For example, a system for processing small objects may comprise a robotic arm 302 as automated object controller with vacuum or other effector suitable for attaching to, lifting, rotating and flipping the object, positioning the object in front of a light 310 and camera assembly 308 multiple times in order to get a complete image of all sides and angles of the object. When non-collaborative robotic arms 302 are included in an embodiment, safety features such as automatic stop when enclosure doors are opened, may be built into the system. In some embodiments, vacuum, conveyance, pneumatic and safety subsystems may be included. Enclosures may be equipped with video cameras to allow users to observe the process.

Referring again to FIG. 3, in certain embodiments, a light assembly 310 may be comprised of a set of lights mounted on a mounting structure. Lighting may be chosen to provide optimal illumination to detect defects on an object surface. Lighting requirements (e.g. distance, color and intensity) may be dependent upon several things, including lighting geometry, light source type, wavelength, surface property of the object to be inspected or measured (e.g. color, reflectivity, texture or materials of construction), object shape, speed of application, the object's distance from the camera and angle of incidence, mechanical constraints and environment considerations. In some embodiments, properties of the object required to make lighting decisions may be determined at the time of evaluation and stored as an object profile record in a database. However, those properties also may be part of an object or device profile provided by the customer via API or other data transfer method prior to evaluation.

Objectives of lighting 310 selection may be to contrast the features that must be inspected or measured, minimize contrast of features that are of no interest, and remove unwanted variations caused by ambient light and differences between objects that are not relevant to inspection. Some embodiments, therefore, may include an easily removable and replaceable lighting assembly 310 to accommodate lighting determined optimal for a variety of surface material, object and image capture attributes. In a preferred embodiment, a lighting assembly 310 may be provided that is capable of providing multiple lighting techniques, including backlighting, dark field illumination and bright field illumination and others. The lighting controller may receive feedback or indication of optical qualities and measurements and adjust lighting accordingly. Lighting 310 may be adjusted in a particular object orientation to account for differences in object properties, such as differences in construction materials. For example, lighting for a mobile device screen may not provide the conditions required for the device border around the screen and therefore requires adjustment as the object is reoriented for image capture.

As was described above, in some embodiments, cameras 308 may be mounted on a camera mount or automated object control system. Cameras and lenses 308 may be selected for their attributes, such as the number of megapixels, their sensor and processor properties, the optical quality of the lens best suited for the desired object to be processed, the expected working distance from the object and the expected defect sizes.

Figure 4:
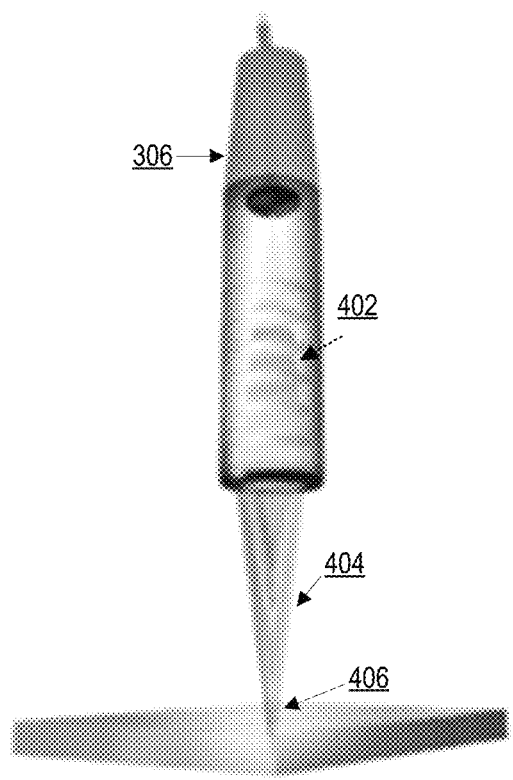
FIG. 4 illustrates an exemplary advanced optical sensor.

An advanced optical sensor 306 allows measurement of displacement, the depth of a defect or the height of a protrusion. As was discussed previously, in addition to length and width, the depth of a defect is required in order to determine the defect character and optimal disposition of an object. In a preferred embodiment, an advanced optical sensor 306 subsystem may be provided to measure displacement, distance and/or position of defects provided by the image processing system. Optical sensors may measure displacement in a variety of surface materials and may filter out interference such as reflections on shiny surfaces. FIG. 4 provides an illustration of an exemplary advanced optical sensor 306. The sensor may comprise a controller, a light source and a set of lenses 402 that fragment the light into wavelengths and form a conical beam 404, creating an optical spot 406 used to measure the defect.

Figure 5:
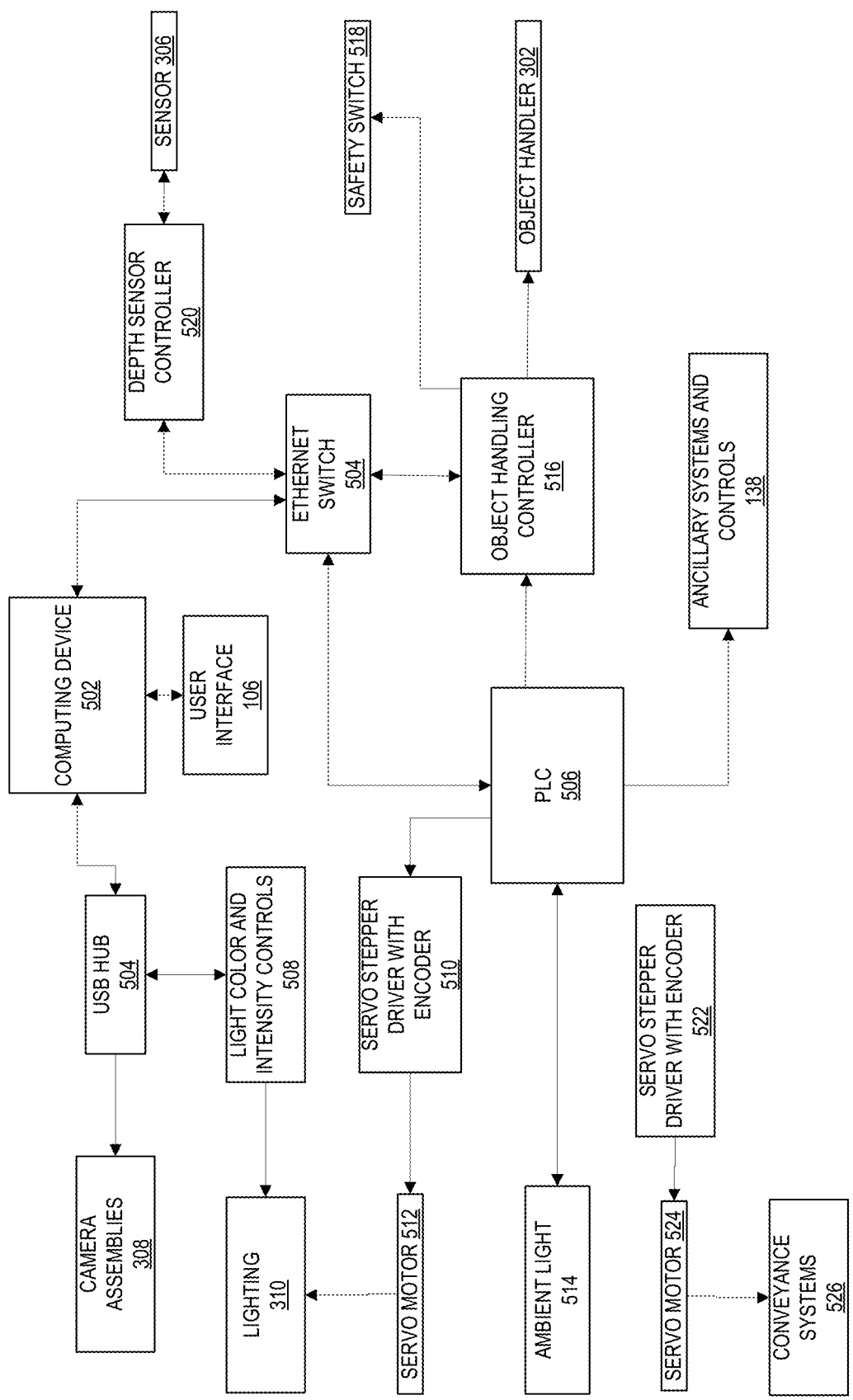
FIG. 5 is a block diagram illustrating exemplary top-level hardware system architecture of a system consistent with this disclosure.

FIG. 5 is a block diagram illustrating an exemplary top-level hardware system architecture of the disclosed system and method. A computing device 502 provides computational services, a graphical user interface 106 allowing a user access to programming, controls and view of system performance; machine learning and image processing modules, access to all embedded software for hardware component controllers (e.g. camera, lights, and sensors) and communications between components 504. A Programmable Logic Controller (PLC) 506 performs all tasks related to embedded software control systems, including camera assemblies and controls 308, lighting 310 and light motion control systems 508, 510, 512, ambient light system 514, automated object controller 302, 516 and safety 518 system, depth sensor controller 520 and sensor 306, object conveyance or feeding 202, 522, 524 and 526. The automated object controller 516 performs automated object motions, movements and object pick, place and handling functions. Ancillary systems 528 may be optional or required subsystems known to those of ordinary skill in the art to support other systems or subsystems, including, for example, pneumatics and vacuum systems in support of conveyance 202, placement mechanisms or automated object control 302 and sensor 306 and safety systems. In some embodiments, the PLC 506 and automated object control assembly 516 may be visualized as children or workers to the computing 502 device as parent or manager.

Figure 6:
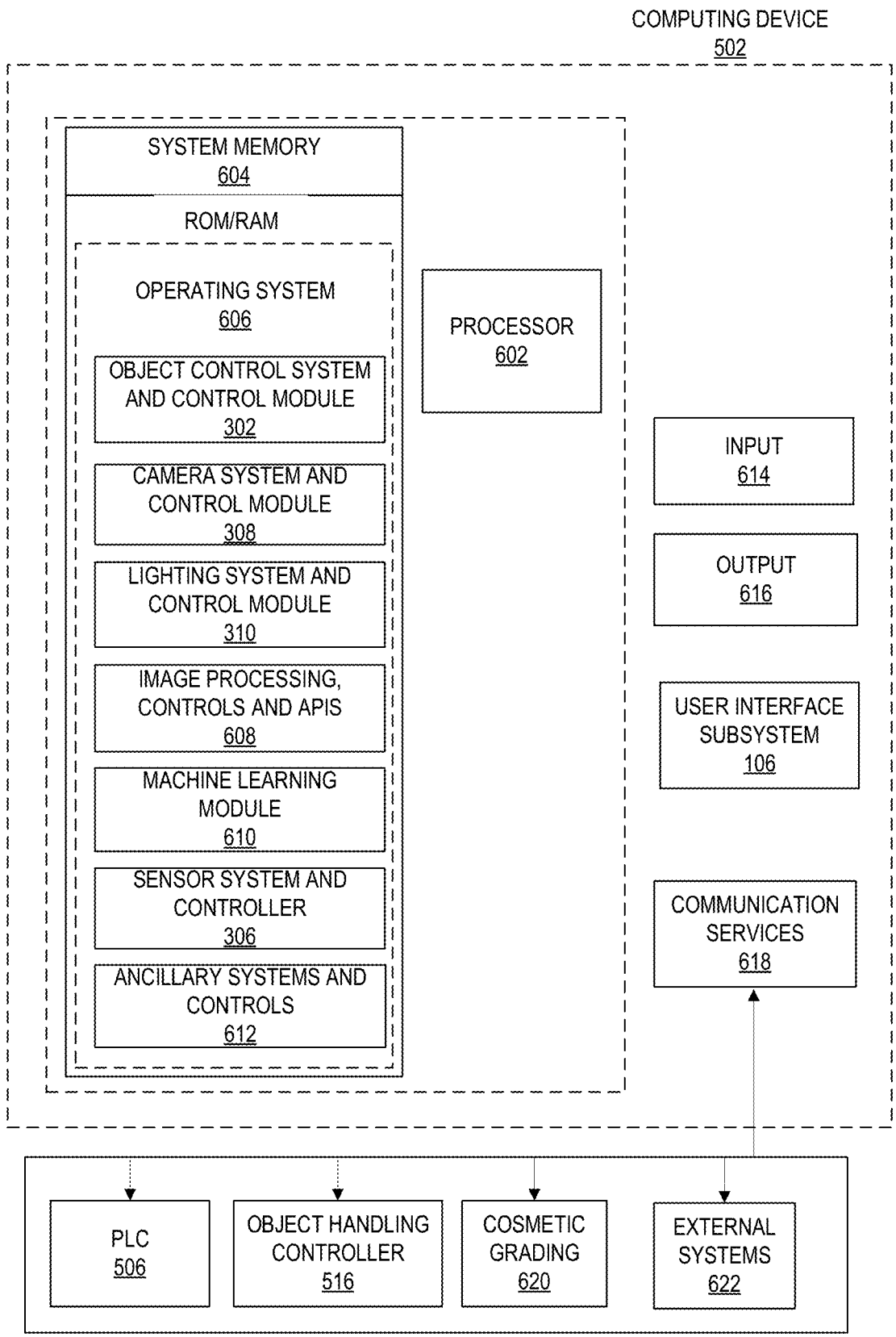
FIG. 6 is a block diagram illustrating an exemplary computing device consistent with this disclosure.

An exemplary computing device 502 consistent with the system and method of this disclosure is illustrated in FIG. 6. The computing device 502 may comprise at least a processing device 602, system memory 604, an operating system 606, computer-executable instruction modules which when executed by the computer cause the system to behave consistent with their functions (i.e. automated handling system and controls 302, 516, camera system and controls 308, lighting system and controls 310, 506, 510, 512 and 514, image processing controls and APIs 608, machine learning module 610, advanced optical sensor system and control 306, 520 and ancillary systems and controls 528, 612), input 614 and output 616 devices, graphical user interface subsystem 106 communication services 618 among modules and to outside systems including the PLC 506, the automated object system 302, 516 and cosmetic grading logic 620 and external customer systems 622, if required. A "computing device" 502 may be comprised of many processing devices and memory units on one machine or across many distributed machines with network communications.

Although no external integrations are required for the disclosed system to perform its functions, the system may be integrated with customer external systems 622, such as return logistics applications for which inspection and cosmetic grading may be an integral activity. These systems may provide optional object profiles including data, such as object identification, color, size, etc., that may aid in performing inspection and cosmetic grading and returning a grade, dispositional path, or recommendation for repair or replacement parts. Further, the inspection and cosmetic grading system logic may be hosted by an external system and accessed via a communications device.

Figure 7:
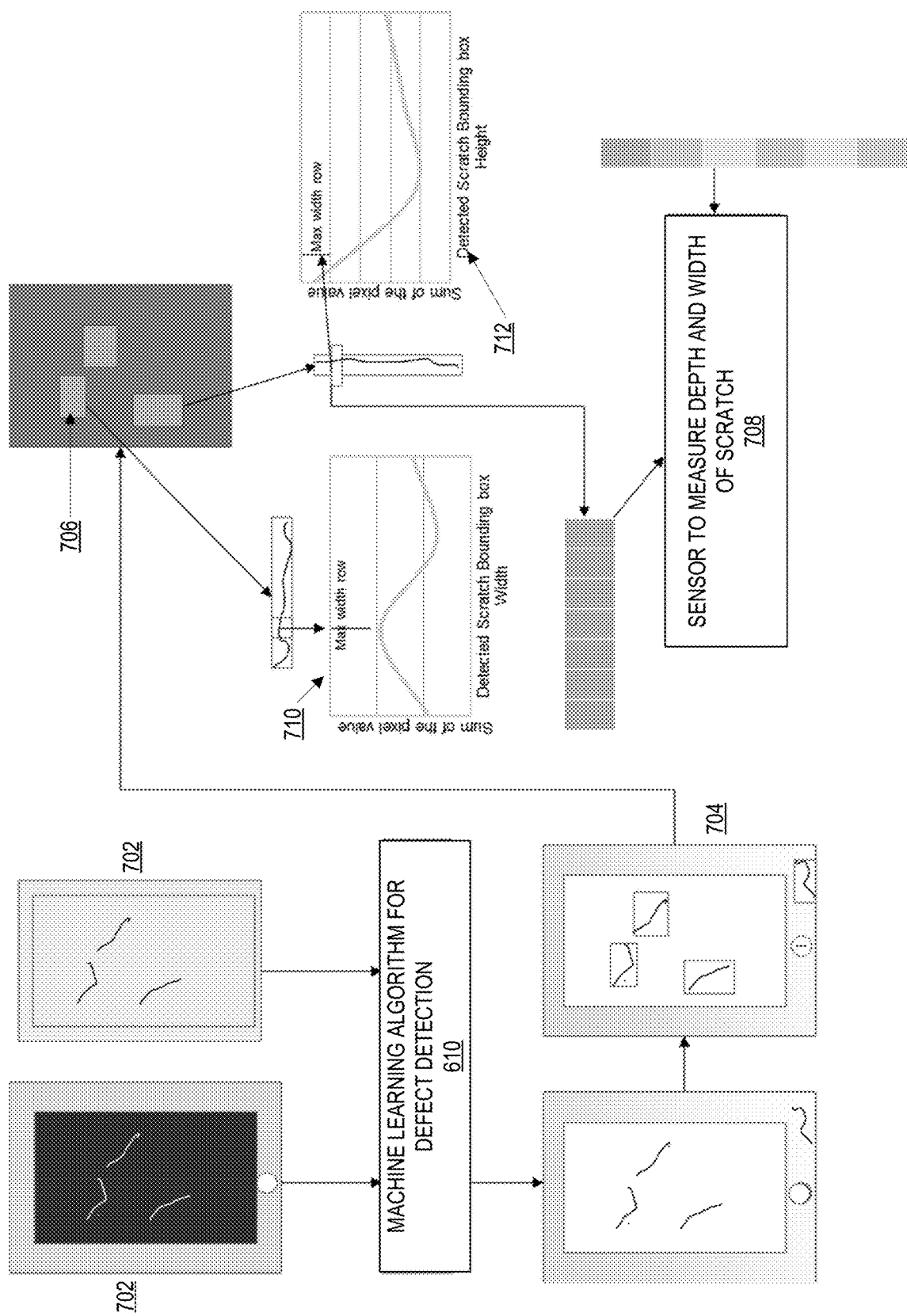
FIG. 7 illustrates the processes performed by an exemplary image processing system consistent with this disclosure.

FIG. 7 illustrates the processes performed by an exemplary image processing system 608. Images captured by the camera 308 for all sides and orientations of an object may be processed with image processing 608 software modules. The image processing 608 modules comprise computer-executable instructions which when executed by the processor stitch the various images together to provide a full, two-dimensional view of the object 702. Image capture and processing modules 608 may serve several functions: (1) determine a coordinate center of the object evaluation area, and other object attributes such as size and color, from an initial image, (2) identify and locate defects 704, (3) calculate the coordinates of the defect 706 relative to the center of the object, (4) determine the location of the highest intensity light reflection for each defect 708 and (5) identify the length 712 and width 710 of each defect.

An initial image, such as the one captured in ambient light 514, may be used to determine the center of an object's evaluation area. If an object profile comprising color and size information about the object has not been provided by an external system, image processing software may identify the color and size of the object and provide this information to the lighting 310 system which makes automatic adjustments for the optimal lighting conditions. The center of the object may provide the origin, or center point for calculating coordinates of defects, as will be described further below. In some embodiments, this measurement may be used to determine the physical center of an object in order to guide an automated object control 302 system to attach to and pick up the object, place it in front of a camera 308 and align it properly for optimal lighting (e.g. lighting configuration, distance from object and lighting intensity) in conjunction with the lighting system controller 310, 508.

In a preferred embodiment, image processing may identify defects using a deep learning algorithm 610 trained on a large number of images with identifiable defects. For example, 2000-3000 images from each side and orientation of the object, with identifiable dents, scratches, and other defects. A trained machine learning system 610 can efficiently locate defects or imperfections and identify them based on a trained set of previously categorized data. Many types of algorithms are available for this purpose, including neural network, convolutional neural network, support vector machines, and others. In an embodiment consistent with this disclosure, deep learning methods are used to separate and classify defects from the background and from dust, lint or reflection or other contaminants or artifacts not related to the surface being processed.

Figure 8:
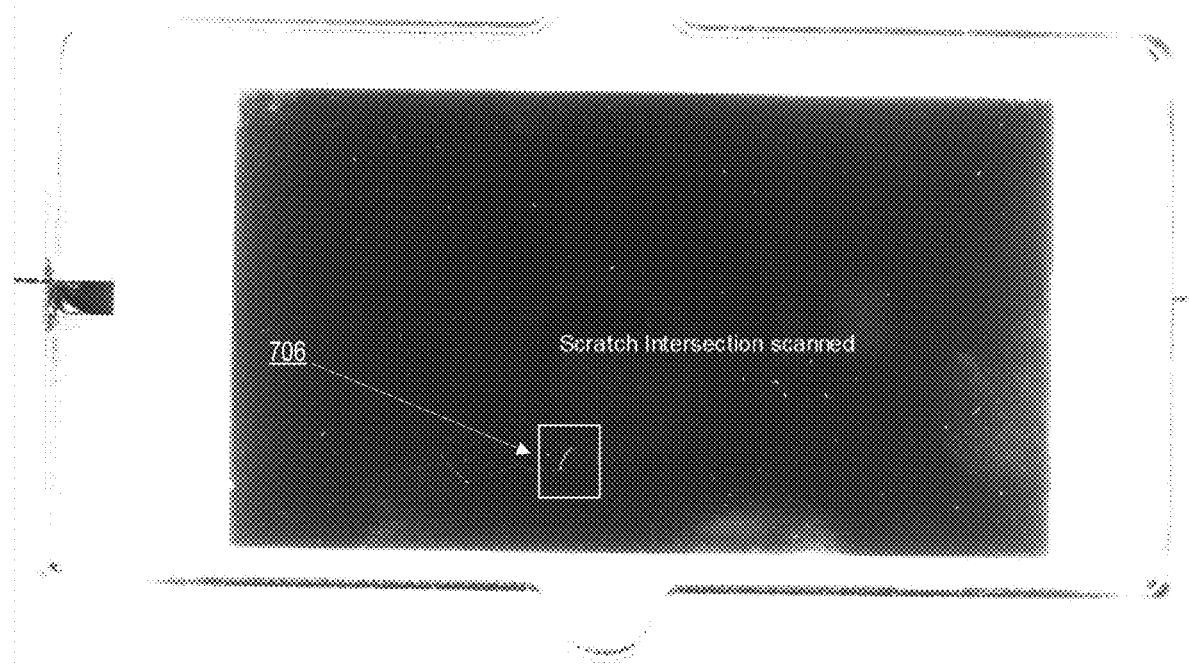
FIG. 8 is a screen shot of an image defect located by an image processing system.
Figure 9:
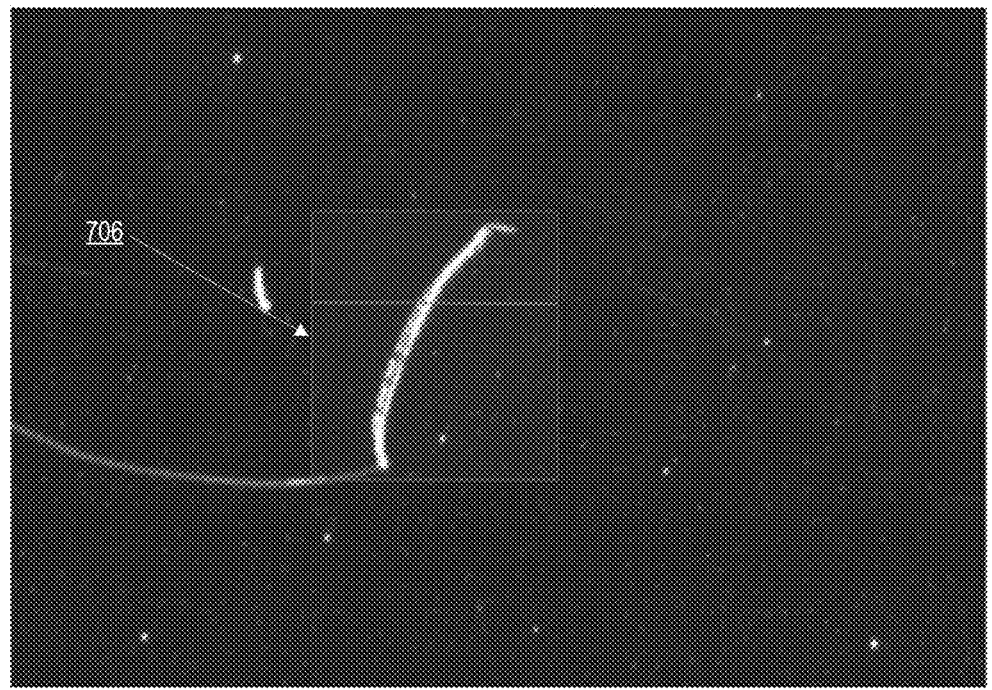
FIG. 9 is a magnified screen shot of the image defect of FIG. 8.

As is illustrated in FIG. 7, deep learning methods 610 are used to detect the defects from the processed image, calculate the length and width of the defect. Coordinates of the defect location may be calculated relative to the previously determined origin or center of the object. In some embodiments, image processing may also calculate the width 710 and length 712 of the defect and locating the pixel of highest intensity light reflection, with the highest intensity reflection indicating the deepest location in a defect. The image processing subsystem 608 may further identify whether the number or dimensions of defects put the object into a particular pre-defined cosmetic grading category according to the logic provided for cosmetic grading 624. Images and results for a particular object may be stored as an object record, along with its unique identification (e.g. serial number, asset ID) in the system database for business history and research. The coordinates of defects determined by the image processing system may be sent to the automated object control subsystem controller which may move and position the object in front of the sensor at the location of the defect. The width 710 and length 712 may be calculated and, depending on criteria, such as the number of defects and their length and width, the maximum reflective light intensity row/column of the defect is located 708 and passed onto the sensor for depth measurement. FIGS. 8 and 9 are screen shots of an image of a defect 706 located by the image processing system. FIG. 9 is a magnified view of the image in FIG. 8.

Figure 10:
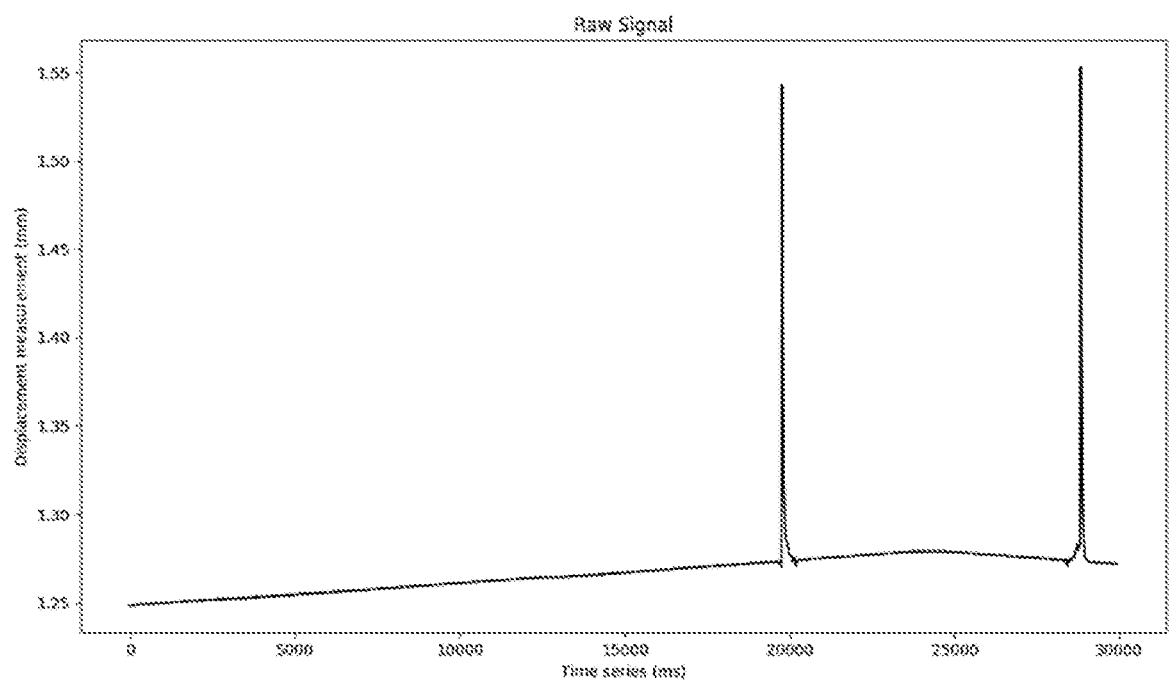
FIG. 10 is a screen shot of the raw sensor signal received at the sensor controller.
Figure 11:
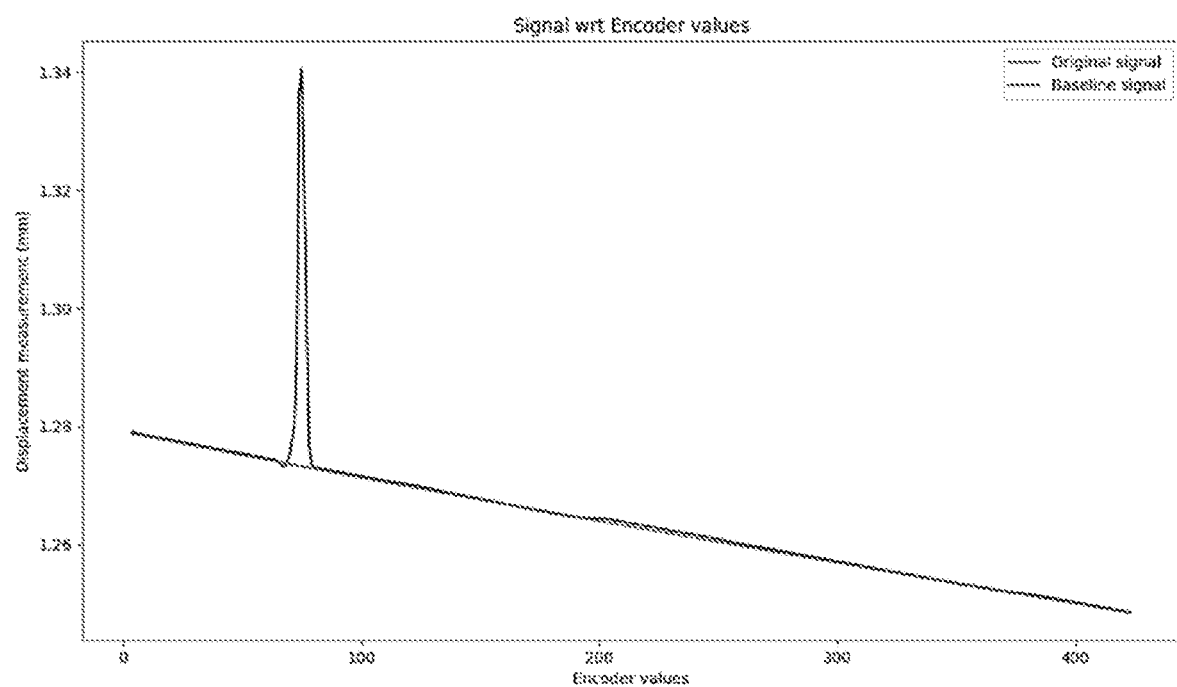
FIG. 11 is a screen shot of the signal of FIG. 10 with respect to encoder values.
Figure 12:
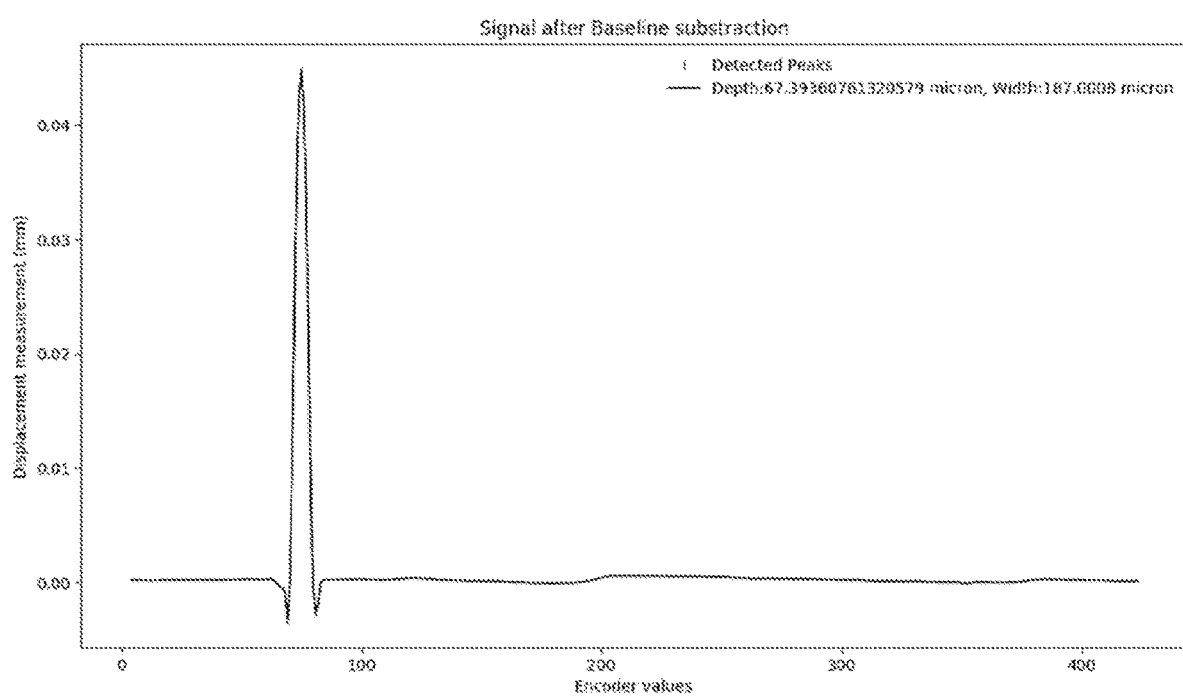
FIG. 12 illustrates the measurement signal received after baseline subtraction and illustrates the average width of the defect and depth as calculated by the sensor controller.

Referring back to FIG. 7, the coordinates of the defect at its point of highest reflected light intensity may be conveyed to the PLC 506 of the automated object controller 302. The automated object controller 302 may move the device to the sensor at the cross section of the scratch where the reflected light is at its highest intensity. Sweeping the sensor 306 optical spot perpendicular to the scratch or defect at the point of highest reflected light intensity provides a highly accurate measurement of the displacement; the depth of the scratch, or the height of a protrusion. Signals are sent to the sensor controller 520 which processes the signals for width and depth measurements. FIG. 10 is a screen shot of the raw signal received at the sensor controller. FIG. 11 is a screen shot of the signal with respect to encoder values, and FIG. 12 illustrates the measurement signal received after baseline subtraction and illustrates the average width of the defect and the depth as calculated by the sensor.

Method for Cosmetic Grading

Figure 13:
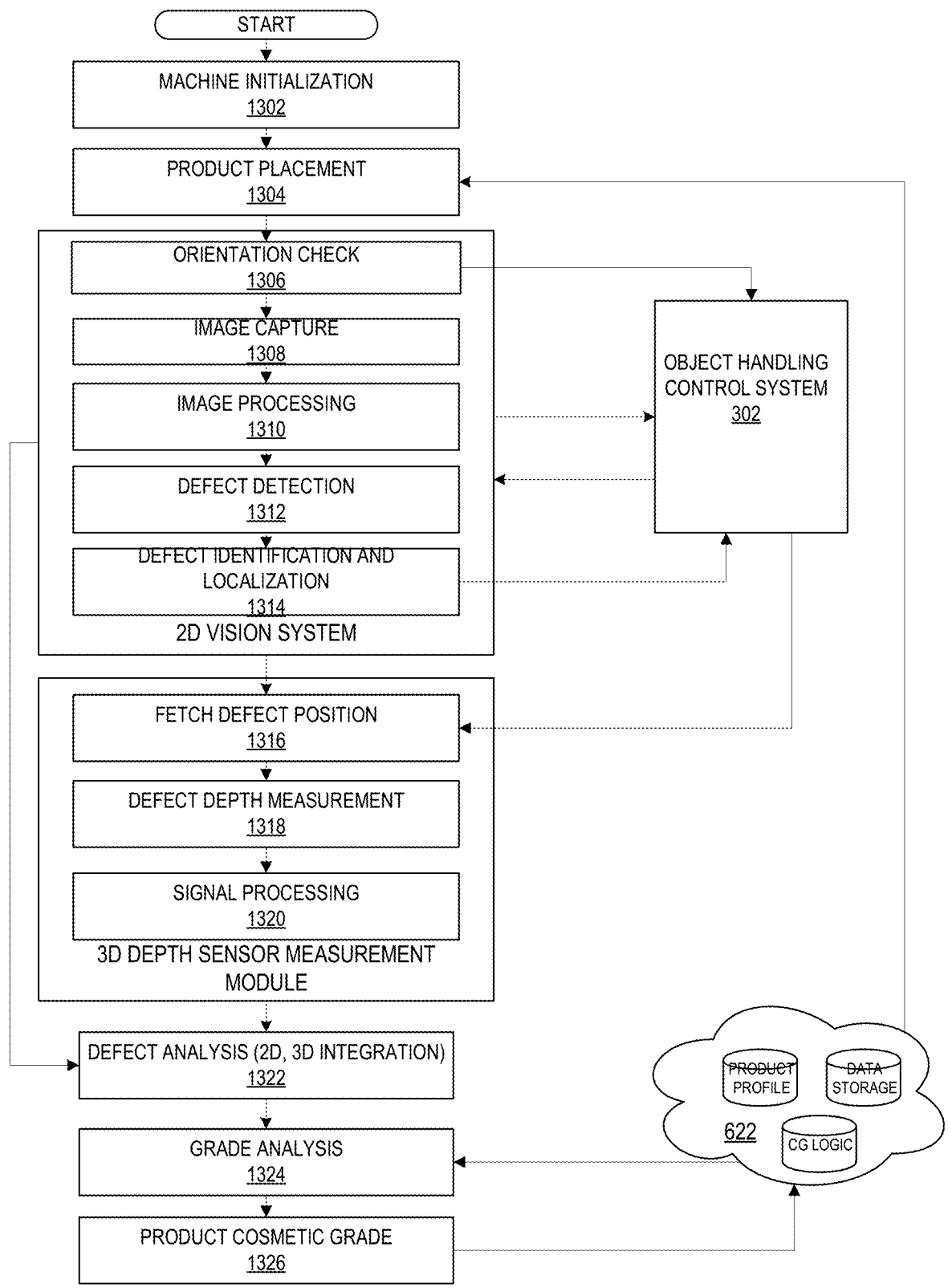
FIG. 13 illustrates the flow of a method performed by a system consistent with this disclosure.

FIG. 13 illustrates the flow of a method performed by a system consistent with this disclosure. This example describes the evaluation of a handheld cellular device by an inspection and cosmetic grading system. The system is initialized 1302, with all components in their home position. The device may be conveyed to the machine 1304 by a conveyor 202 or placed directly into the system. The object handling system 302 determines the orientation of the item 1306; the object may be positioned in front of the camera 308 and light assembly 310 by the automated object control extension 304. The system determines the optimal lighting and adjusts the lighting assembly accordingly. A series of images may be captured as the automated object control 304 rotates the device to allow the camera to capture images from multiple angles and positions 1308. Image processing software, discussed and illustrated in FIG. 7, processes the images and combines them into a comprehensive image of the device 1310. The combined image may then be fed to a deep learning algorithm 610 which may distinguish scratches, dents, dings and cracks (aka defects) on the surface 1312. The image processing system 608 provides the automated object control 302 with coordinates for the defect, locates each defect and determines the width and length of the defect and the location of the highest intensity pixel 1314. If the object is clean or has a limited number of defects, as previously defined by a customer, a cosmetic grade 622 may be assigned with no further evaluation required. However, if the system determines that a depth measurement is required, the defect coordinates may be provided to the automated object controller 516, which may position the device in front of the sensor 306 at the coordinates of the point of highest intensity 1316. For each such location, the sensor is swept perpendicular to the scratches at the points of greatest displacement (highest light intensity pixel) 1318. Signals sent by the sensor to signal processor 520 to determine the width and depth 1320 measurements. This information is added to an item profile and conveyed to the computing device where it is stored with the images for historical record of the product profile and used for defect analysis 1322. A grade analysis is performed using the product profile with a complete defect record and rules for cosmetic grading 1324. The system determines and assigns the appropriate grade and disposition for the item 1326.

Figure 14:
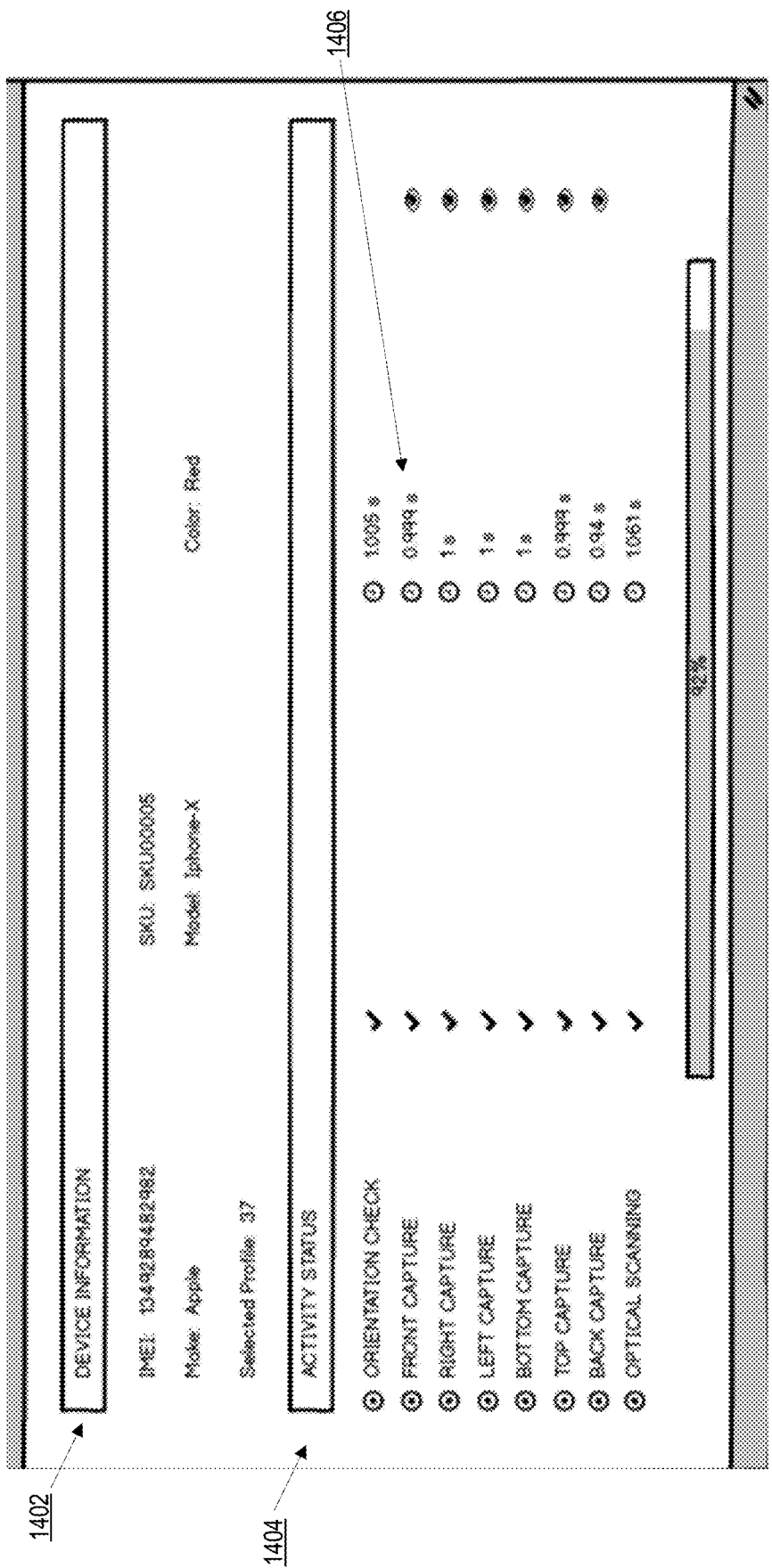
FIG. 14 illustrates an exemplary screen shot for monitoring the process as it proceeds.
Figure 15:
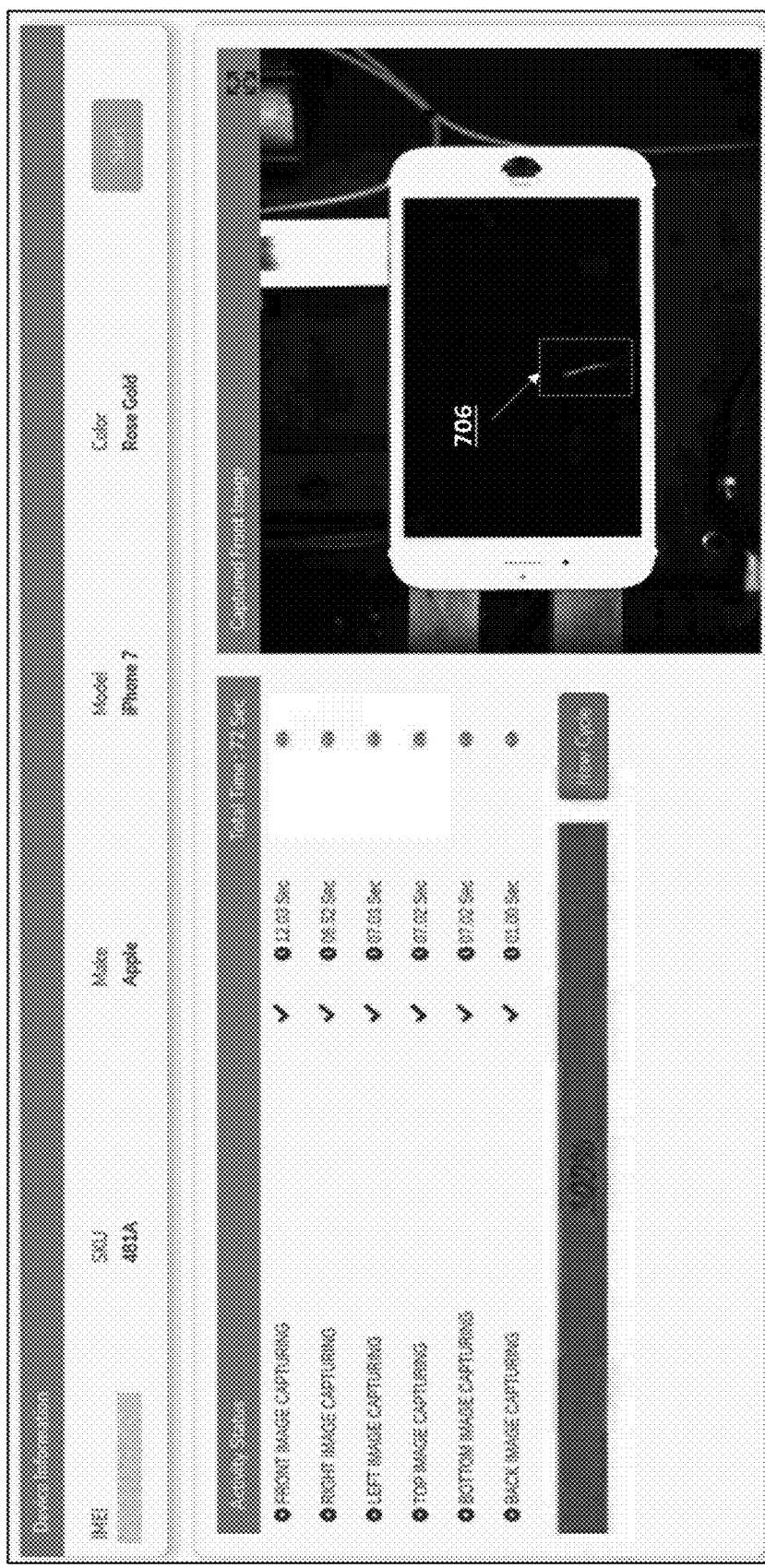
FIG. 15 is a screen shot of a view of a mobile device with defects identified by image processing software.

As was illustrated above, an operator may have access to view or control the process through an interactive user interface 106. The interface may be accessed using the PC, a remote computer, a touch screen located on the inspection machine, by mobile phone, or other device with a network connection. The user or operator may view the process as it proceeds, as is illustrated in FIG. 14. Here, the user may view the item currently under inspection 1402, including its identifying information, color, make and model and the selected profile for the item. The user may also view the activities 1404 as they progress and the duration of each operation 1406. Other screens allow the user to input or correct information. For example, if there is an IMEI/color mismatch in an item profile coming from an external system, the user may correct the color using a profile capture screen. FIG. 15 is a screenshot of a view of a mobile device 1502 with defect identified by bounding boxes. The operator may view images 1504 from all sides of the device and verify identification of each type of defect 1506.

Figure 16:
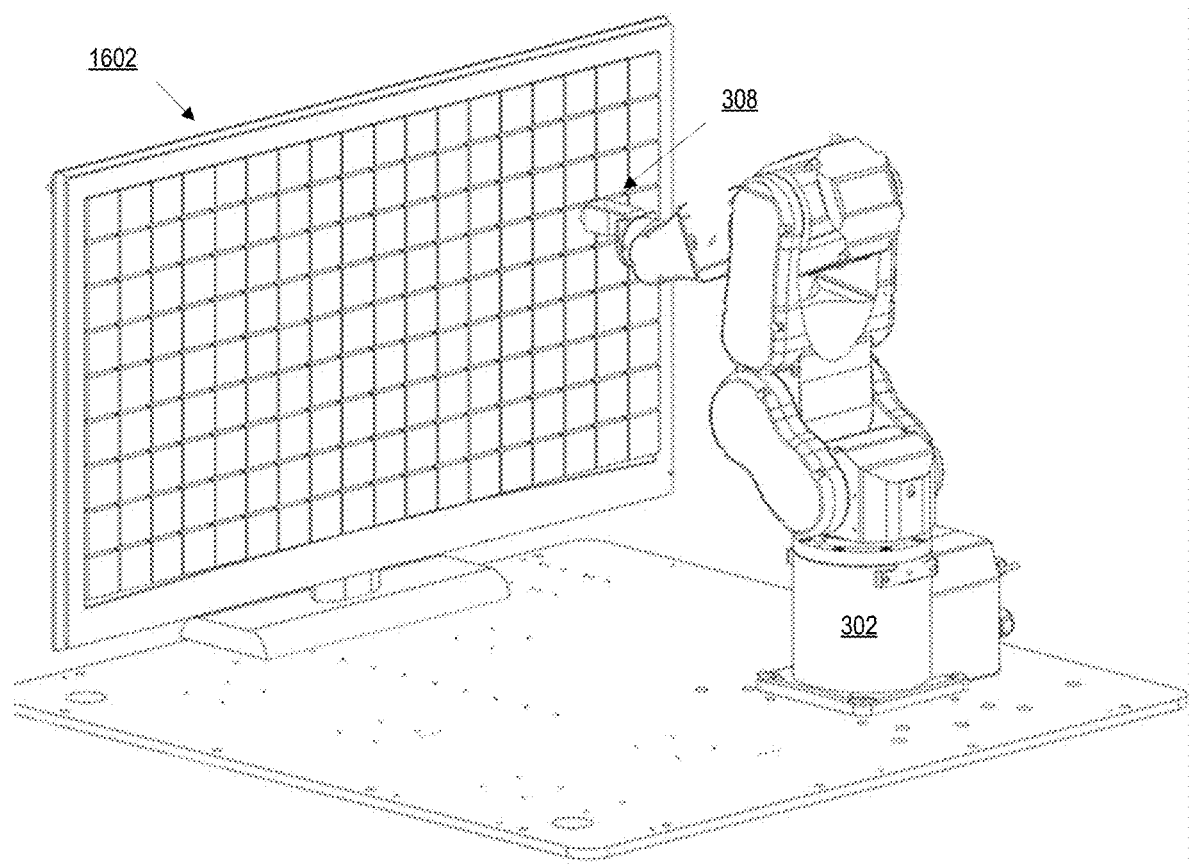
FIG. 16 is an illustration of an alternative embodiment for capturing images in larger objects.

As was discussed previously, alternative embodiments are contemplated for inspection and cosmetic grading of larger objects. For example, a large screen television, which cannot be picked up and rotated may be made stationary while the camera is held by the automated object control with the subsystems moving around the object in order to capture the required images. FIG. 16 provides an illustration of such an automated object control 302 (here, a robotic arm)/camera 308 and object 1602. Not shown are the enclosure 102, the image processing 608 and lighting subsystems 310, which perform their functionality consistent with earlier described embodiments. Also not shown is the sensor system 306, which is contemplated in some embodiments to be operatively connected to an automated object control 302, which receives from the image processing system 608 coordinates for defects and high intensity pixels and may be positioned at the coordinates to measure precise width and depth of a defect. In some embodiments, the automated object control mechanism may replace the camera with the sensor following image processing, measuring depth according to the coordinates provided by the image processing system.

Still other embodiments of the disclosed system and method may be adapted for use with larger products. For example, a car may be cosmetically graded or evaluated in a drive-in enclosure equipped with an arm 302 that may support the camera and lighting system. The arm may revolve around the vehicle capturing images of the entire vehicle. Image processing may determine the coordinates of a defect and provide the coordinates to the sensor 306 for depth measurement. These examples are not to be considered limiting and are for illustration only. Alternative embodiments may be adapted for the size, or other special requirements for inspecting defects on an object surface, where the embodiments comprise the components disclosed herein in alternative configuration and function.

Cosmetic Grade Tuning

As mentioned above, cosmetic grading of a product may be standardized for an industry by an organization, such as CTIA™. Alternatively, a user may wish to grade according to a different grading scheme. The disclosed Inspection and Cosmetic Grading system and method may determine a new customized grading model through a cosmetic grade tuning process.

Figure 17:
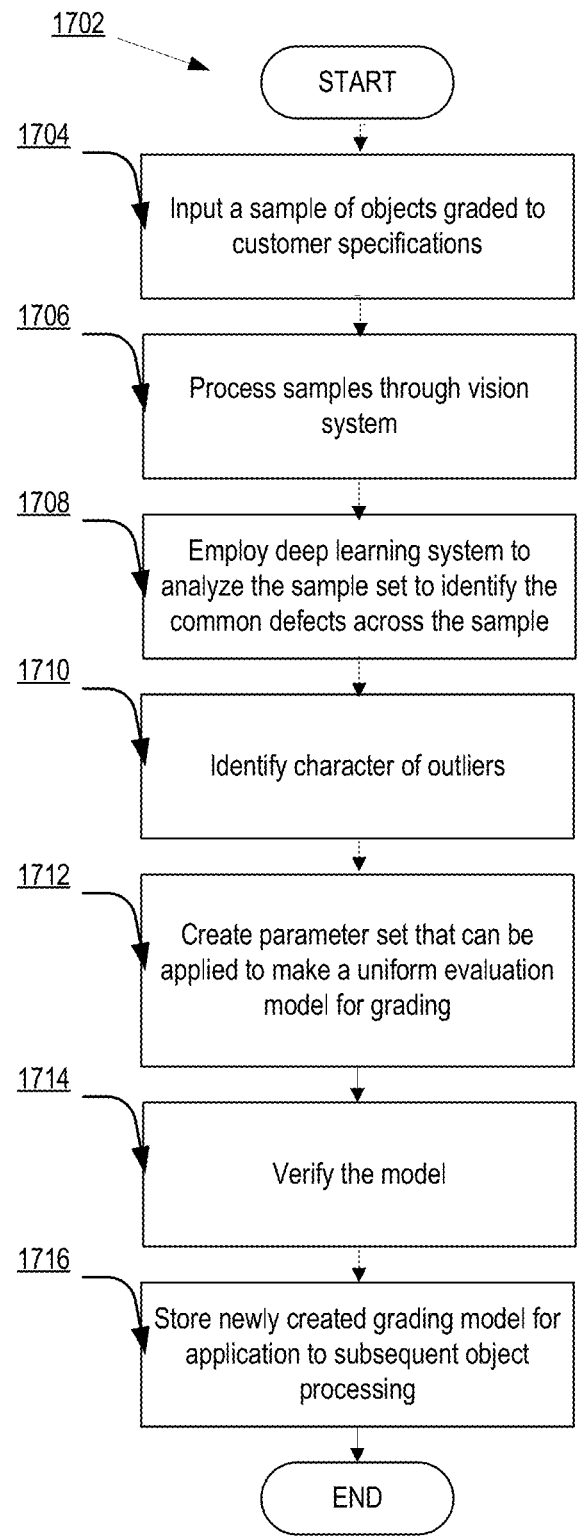
FIG. 17 illustrates the process of automatic cosmetic grade tuning.

Referring to FIG. 17, a cosmetic grading machine may be presented with a sample of pre-graded products 1704 that may be human or machine graded, but that have been determined to be a "golden sample" representing the grading characteristics desired by the user. A deep learning model is created by processing the samples through the vision system 1706, training on the samples, identifying common defects across the sample to classify each grade as well as determine the core features of the grade 1708 and any outliers 1710. The system automatically creates a parameter set 1712 that can be applied to make a uniform evaluation model for grading. During testing, the model may be verified 1714 by running samples through the process and confirming that consistent and accurate results are achieved. The newly created model 1716 may then be stored for subsequent processing.

Automated Calibration of Vision Systems

Industrial machine vision such as that used in a preferred embodiment of the type of system and method described herein, usually provides the most effective and economical solutions to solve many automation inspection and quality control problems in production environments. Surface defect inspection is one of the critical quality control aspects in many industries. Due to the complex nature of surface defects and variety of surface finishes, texture and color, the inspection process can be error prone and more subjective than desired. In order to achieve accurate and repeatable objective grading an automated vision inspection can play a greater role in solving the limitations associated with manual grading process. The cosmetic grading machine is an intelligent three-dimensional industrial machine vision system for cosmetic inspection and grading of smart display devices like smartphones and tablets.

The performance of the industrial computer vision system relies on its robustness. The robustness in this context is more than just reliability. It is a reliability that is maintained within the natural variations of the environment in which the system is being used and how quickly it can be recalibrated and reset to achieve its desired performance.

Figure 18:
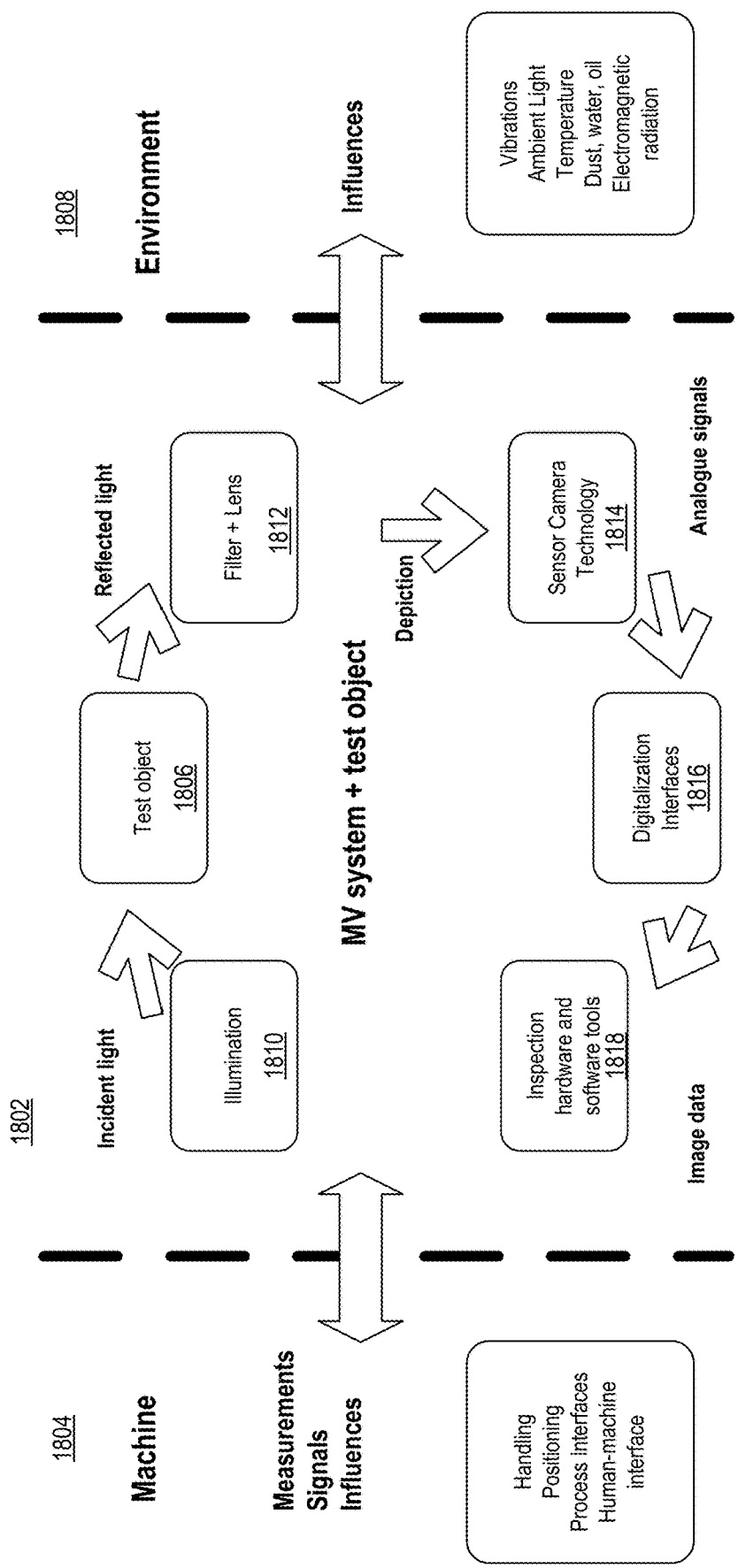
FIG. 18 illustrates the factors influencing machine vision performance.

As is illustrated in FIG. 18, a number of factors 1802 come into play here, including influences from the machine vision component effects 1804, object variations 1806, and the surrounding environment 1808. There is a very large difference between a solution that works in a demonstration lab environment and one that deals effectively and accurately with all the variations to which an industrial environment will expose the system. Several influencing factors must be considered during the development of a machine vision system for a specific application. The starting point for this consideration is the object to be inspected 1806, defects to be analyzed, repeatability and accuracy in the measurement and the process environment in which the system must be installed.

An embodiment of an inspection and cosmetic grading system as is described herein may comprise a high-end vision camera sensor, a specially designed high-power LED lighting system, robotic manipulator and hard automation for device feeding, holding and centering which is controlled by a motion control computer. For the computation of complex artificial intelligence algorithms and image processing a high-end computer system is used.

In order to achieve stable machine vision performance, the system is designed to operate 24×7 without any stoppage. The system is designed and built with high quality industrial grade mechanical, electrical and vision components. The vison components are mechanically secured with multiple mounting points and are isolated from other moving parts to insure stability. The camera may be one having long service life as long as it's used under specified temperature and environmental conditions. The customized LED bar light with well-designed heat sink provide long service life. All moving components that include ball screw linear actuators and slue bearings are chosen that do not require frequent external lubrication, the dry vacuum system ensures maintenance free operations. A well-ventilated electrical panel and computer enclosure provide no heat-buildup and safety of the electrical system.

The features described herein impart smartness, auto calibration for repeatability and accuracy, automated built-in-test for light diagnostics and intelligent, adaptive, automated deep-learning model training and re-training pipeline. The following sections will describe the need and methods of implementation of the above-mentioned features in an automatic cosmetic grading machine.

Automatic Calibration/Re-calibration of Vision System

Referring again to FIG. 18, machine vision systems consist of several component parts, including illumination 1810, lenses and filters 1812, camera technology for image acquisition 1814 and data transfer 1816, and image processing and measurement software 1818. The capabilities offered by machine vision have grown exponentially as technology continues to deliver improved performance in all areas. The overall complexity of the system is determined by the specific application requirements. Choosing the optimum components for a robust vision system should be based not only on their ability to achieve the required measurement (appropriate resolution, frame rate, measurement algorithms etc.) but also on external machine and environmental influences and conditions 1808. Especially in an industrial environment, these can include part variations, handling, positioning, the process interface, vibrations, ambient light, temperature, dust, water, oil and electromagnetic radiation.

The challenges posed by external factors can have implications both in terms of potential damage to the machine vision components themselves, and the effects that they might have on the actual measurements. Many modern cameras are built to work in temperatures as low as −5° C. or as high as 65° C. without damage. However, increased temperatures can lead to more noise in the image from the camera sensor 1814.

In addition, temperature affects the performance of LED illumination 1810, the most commonly used illumination source in machine vision. As LEDs heat up their brightness drops. This can be compensated for by using a lighting controller that can adjust light output in line with a temperature compensation profile for the LED. LEDs themselves generate heat as well as light and this can cause accelerated ageing or even total failure, so requires efficient heat management in the system design.

Other components can be chosen on their temperature resistance. For example, industrial and embedded PCs are available with the computing power needed for modern vision systems but the ability to operate over a wide temperature range without fans, is a significant source of failure in PCs. While this illustrates how vision components can be chosen to provide a robust solution, it is also important to recognize that temperature could affect the object being measured. For example, temperature effects can cause expansion or contraction particularly in metal components, leading to variations in their actual linear and volumetric dimensions.

Calibration, pointing accuracy, and repeatability are critical to the success of vision systems for measurement. This is especially true for precise 3D measurement applications where single-pixel measurements are needed to help machine vision systems accurately gauge their environment. Even the smallest misalignment between optics and the components holding them in place will significantly affect the repeatability of 3D measurements. Influencing factors are:

Vibration & shock—Many modern cameras are designed with high resistance to vibration and shock. Robot or track-grade cables are available for applications where the camera moves. Lockable connectors prevent them being dislodged by vibration. Ruggedized PCs and embedded computers offer good mechanical stability. Fixed focus lenses in metal mounts with lockable screws provide shock and vibration protection. Filters can provide simple protection of the lens surface.

Ambient light—The use of daylight cut filters can make an application independent of ambient light such as changing sunlight. By using a high brightness pulsed LED, reduced sensor exposure time and stopping down the aperture, the effects of ambient light can be minimized. Using a wavelength such as IR for measurements reduces the influence of visible light fluctuations. Also, enclosures for the entire vision set-up can eliminate the interference of ambient light during image capture.

Dust/dirt/water-Many cameras are available in housings rated to IP65/67 which effectively protects against dust, dirt and water splashes. Dust, dirt, liquids or vapors can stick to the LED or the surfaces of the lens system, reducing the light reaching the sensor. This can be overcome by increasing the camera gain, by software processing of the image or by adjusting the output of the LED. Again, enclosures for entire vision set-up can minimize the dust ingression during image capture.

Method of Calibration & Recalibration

Figure 19:
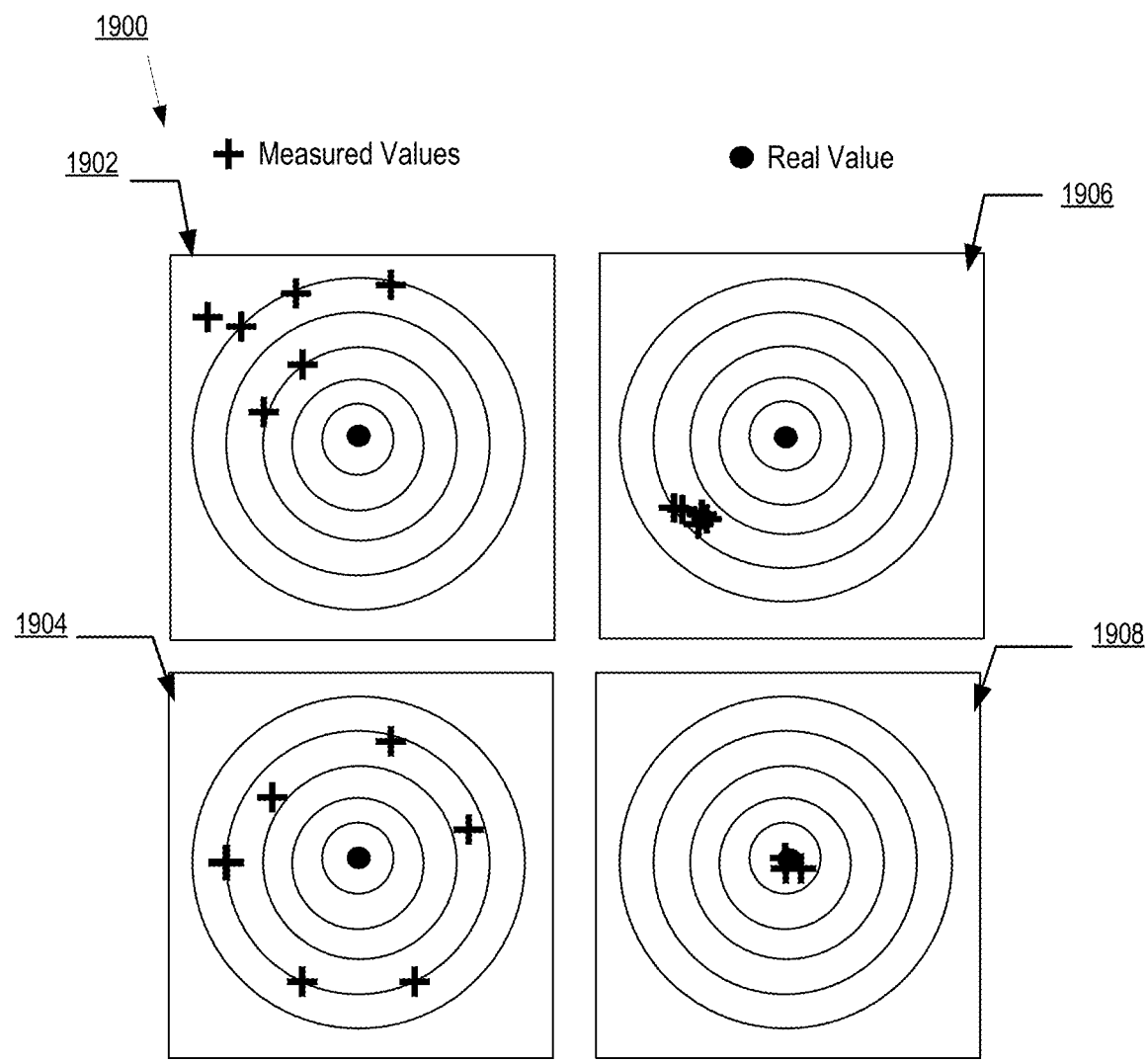
FIG. 19 illustrates repeatability and precision matrix of measurements with vision systems.

As can be seen in FIG. 19, the accuracy of the machine vision system results from the sum of all individual errors (repeatability errors, 1904, 1906 and inaccuracies 1904, 1906, 1908) of all components and the interfering influences of the operating environment into which the system has been integrated. The repeatability and precision of the results indicates how close the individual measuring results are, as is reflected in 1910.

A vision system calibration may comprise two aspects. One aspect is to calibrate the vision system to achieve repeatability of measurements 1908 and 1910) and the other aspect is to achieve precision and accuracy of measurement 1910. The precision and repeatability can be proven by means of a "golden sample", when the same component with known dimensions is sent through the inspection cell several times, as was illustrated in FIG. 17.

Figure 20:
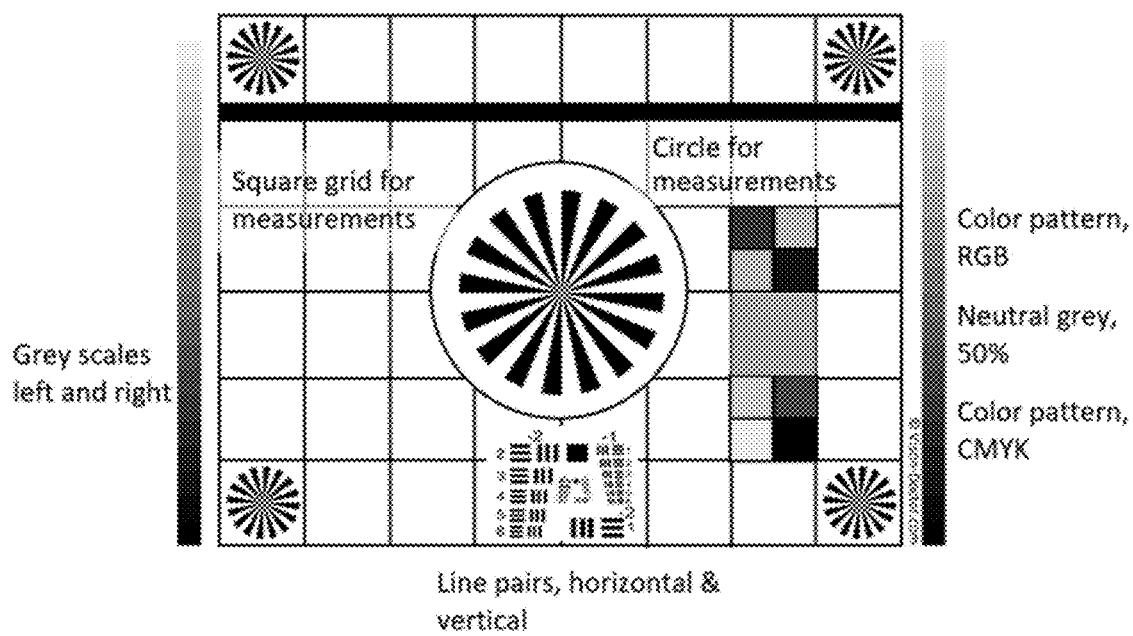
FIG. 20 illustrates a calibration target sample.

Several types of calibration test samples can be used for optimizing and calibrating a vision system, such as the calibration test target sample shown in FIG. 20, which tests for grey scales, color patterns, line pairs & horizontal and vertical pairs, and circle and square grids for measurements.

Figure 21:
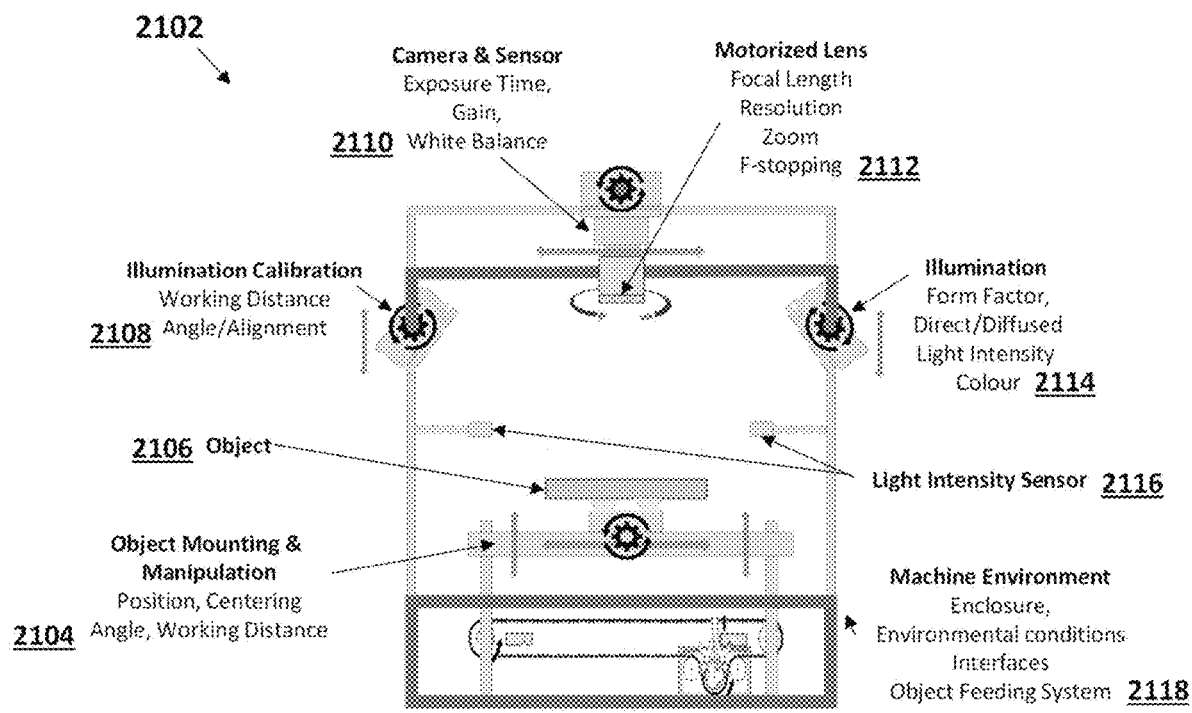
FIG. 21 illustrates an exemplary vision system set up.

For precision and accuracy, especially for measurement precision and accuracy, calibration of surface defects may use standard calibration reference samples compliant to PFR MIL-13830B or ANSI/OEOSC OP1.002-2009 or ISO 10110-7:2017. A typical machine vision system for cosmetic inspection and grading with components requiring calibration is shown in FIG. 21. A machine vision system 2102 may comprise an object mounting and manipulation platform 2104 for positioning and centering the object 2106, obtaining information such as the centering angle and the working distance; an illumination or lighting calibration 2108 to set the working distance angle and alignment; a camera and sensor 2110, which requires calibration of exposure time, gain and white balance; a motorized lens 2112 for which focal length resolution, zoom and f-stopping may be calibrated; illumination calibration 2114 of form factor, direct/diffused light intensity and color; a light intensity sensor 2116; and a machine environment itself 2118, with enclosure, environmental conditions, interfaces and object feeding systems which may need to be calibrated. The working distance of camera, lens focal adjustments, lights distance and angle and object position in the camera field of view may be adjusted with the help of a motorized system controlled by a precision motion control computer (see also FIG. 22). Image capture, light strobing and object manipulation signals may be controlled by a main computer. A programing interface, deep-learning algorithms and image processing algorithms may be integrated in a main computer system that analyses captured images, performs image processing and deep-learning computation to detect, identify, classify and measure various surface defects on the object surface and compute cosmetic grade of the object under inspection.

During the initial calibration all vision system parameters like camera position, camera field of view, exposure time, gain, white balance, Lens focal adjustments, light distance, light angle, light color and intensity, object centering and positioning with respect to camera field of view and uniform distance from light is programmatically adjusted to get high contrast and sharp images of the object.

A calibration sample as described above may be used to adjust and set the vision system parameters. Trial runs may be taken to evaluate the precision and repeatability of measurements on the standard calibration sample and ideal state of vision parameters may be recorded and stored in the main computer as an initial calibration setting. Also, the reference images of the calibration sample with relevant calibration factors may be stored in the main computer.

In order to reproduce the same state, some test tools may be integrated in the software which make it easier for the user to reach the same state as at the beginning. Physical parameters that may be detected by a camera system must be brought back to their initial state by means of calibration:

Primarily, a camera system measures the brightness intensities (I) of each pixel. In the case of an RGB color camera, these will be intensities per color channel, i.e. I*R, I*G and I*B. With the help of area-based statistics tools/light intensity sensor, the vision specialist easily determines the grey values on a reference surface. Then the image brightness correcting the shutter speed of your camera or lens aperture can be restored.

With the help of measuring tools, the X and Y coordinates and orientation of an object may be detected. A small measuring application that calculates the offset and angle between test object and a reference vector immediately indicates whether the camera still detects the same inspection field and how far it deviated.

The Z-coordinates may be calculated using the camera system, although the camera system is primarily only capable of detecting X-and Y-dimensions. However, this is nevertheless possible, as soon as the dimensions of a test object is known, for instance. Using an endocentric normal lens, the inspected parts appear the smaller, the further away the camera. If, for instance, measurement taken on a rectangular component and scale the dimensions of any random pixel values to 100% in the ideal state, it is easy to detect whether the camera has moved away from or towards the object. If the vison expert observes that the Z-axis is misaligned, re-scaling is stringently required.

Using a simple additional measuring application and a brightness measuring tool, the user be able to adjust the system in such a way that the intensity, translation, rotation and scaling can be corrected to the initial values.

Automated Re-Calibration

The vision system calibration is a key factor to achieve the maximum overall performance and is necessary in all cases when absolute measurement on images is performed. Often with continuous operations in industrial environments the performance of a vision system degrades due to several parameters. Thus, recalibration of the vision system becomes important to re-establish the original performance by optimizing and tuning vision parameters.

The user of artificial vision applications usually does not have the required skill, patience and interest in laborious manual calibration methods. Therefore, vision system calibration must be simple and as quick as possible. This can be achieved by integrating an advanced deep-learning and image processing algorithm to recalibrate the vision system automatically.

The recalibration allows finding the correspondence between image points and workspace. The calibration program should be executed at least once after the system set-up, in order to determine the model parameters that are used every time an image is grabbed for part measurement purposes. Key parameters are external, internal and optical distortion.

External parameters describe the camera position: translation and orientation in some world coordinate system. Internal parameters include the image center, that is the intersection between the image plane and the optical axis, the focal length, to determine the perspective projection, the image or pixel aspect ratio and the scale factor (typically in mm/pixels).

The optical distortion caused by the lenses may be reduced below the maximum acceptable error in two ways: with software methods, increasing the hardware requirements and the processing time, or with more expensive optical devices. The maximum acceptable error in the case of digital imaging is one pixel or the sub-pixel algorithm accuracy.

Figure 22:
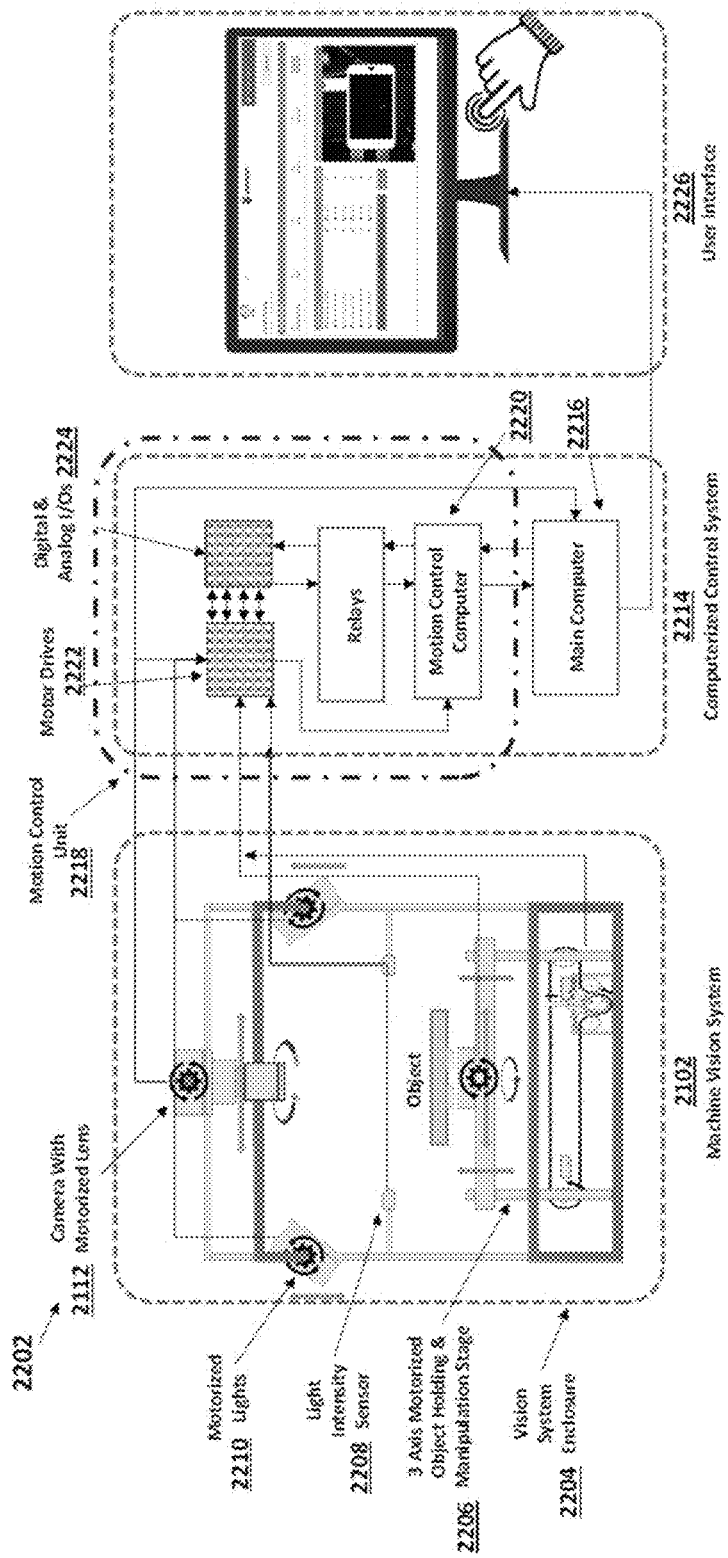
FIG. 22 illustrates a closed-loop machine vision system.

In a preferred embodiment, a vision system as described as in FIG. 21, can be further explained as a fully automated closed loop system in detail as can be seen in FIG. 22. A closed feedback loop of the vision system 2202 is proposed in which various positional sensor-like encoders, optical distance measurement tools, suitable controllers and motorized actuators are integrated. A vision system enclosure 2204 houses the components, including a 3-axis motorized object holding and manipulation stage 2206, a light intensity sensor 2208, motorized lights 2210, camera with motorized lens 2112. This subsystem is integrated with the computerized control unit system 2214. The computerized control system 2214 comprises a main computer 2216 and control unit 2214 houses further comprises a motion control unit 2218 which includes a motion control computer 2220, motion control motor drives 2222 and digital and analog i/o components 2224. This system is integrated to programmatically control position and orientation and centering of the object with respect to the camera field of vision and lights. It is also used to perform complex computation for image processing and deep learning algorithms to fine tune and optimize vision system parameters.

The log-in and selection of various applications and the inspection operation is actuated with the help of graphical user interface 2226. The initial calibration and recalibration of a vision system must always be performed using a target calibration test sample as described above.

The initial calibration of the machine vision system is done during system build and testing. During the initial calibration all vision system parameters with a reference image of a target calibration sample are stored in computer memory. After setting-up and initialization of the machine at user sight, an on-field auto-recalibration should be performed to achieve original performance and repeatability of vision system. Table 1 describes the auto calibration flow.

TABLE 1

Autocalibration Flow

1. During set-up, the machine gets initialized with default preset parameters like camera settings, lens settings, object positioning, and software parameters of trained AI and IP algorithm models (Initial Conditions)
2. After log-in to machine user can choose the auto-calibration menu on Machine GUI
3. The user then places the calibration test sample in sample holder and initiate auto-calibration cycle
4. The system then initializes image acquisition based on default machine parameters
5. The proprietary trained AI-ML models Analyses the acquired images and initiate the vision system optimization and tuning.
6. The optimization models are based on nonlinear multi-parameter optimization techniques based on Genetic Algorithms, Particle Swarm optimization or Gradient descent methods
7. A search space i.e. the constraints of each tunable parameter are set initially. The algorithm will analyses an image with the initial conditions pass it through the pre-trained model trained to identify the generic defects on target calibration sample surface.
8. The output of the model will be compared with the reference calibration image data stored in the computer memory. The comparison will be scored appropriately as per the training algorithm.
9. The algorithm will then set the tunable parameters within the search space and iterate the process of calculating the comparison score.
10. After a batch of images acquired at different values of tunable parameters are captured the gradient of the comparison score will prompt the algorithm to appropriately tune the parameters.
11. During the optimization process the software computes the deviation in processed image with respect to reference image and generate the actuation signal for tuning the vision system parameters that including working distance, camera settings, light settings, object position and alignments etc.
12. Image processing applications not only have features to convert pixels to millimeters, but also performs pixel-based segmentation and pixel-based image distortion analysis based on reflected light intensities
13. A multi-point coordinate system automatically determines the origin, the location of the X-axis and Y-axis and scaling. Complex multi-point or chessboard pattern systems are even capable to compensate nonlinear distortion such as lens or trapezoidal projection errors. A perspective distortion can be minimized after tuning several parameters
14. The process will keep on iterating till the parameters are tuned to the best possible configuration to identify the defects in comparison with reference image
15. Once a near optimal setup configuration is achieved the algorithm continues to iterate to train the deep learning model to perform fine tuning of parameter to restore ideal settings (golden parameters)
16. This alternating pattern of training the vision parameter setup and the deep learning model gives the optimal configuration and calibration.

Automated Light Diagnostics

Lighting plays a major role for industrial machine vision. Homogeneous lighting conditions result in a consistent image of the inspection object. Fluctuating light conditions are therefore to be avoided. To maintain the consistent performance of vision system the light source must be maintained periodically.

Figure 23:
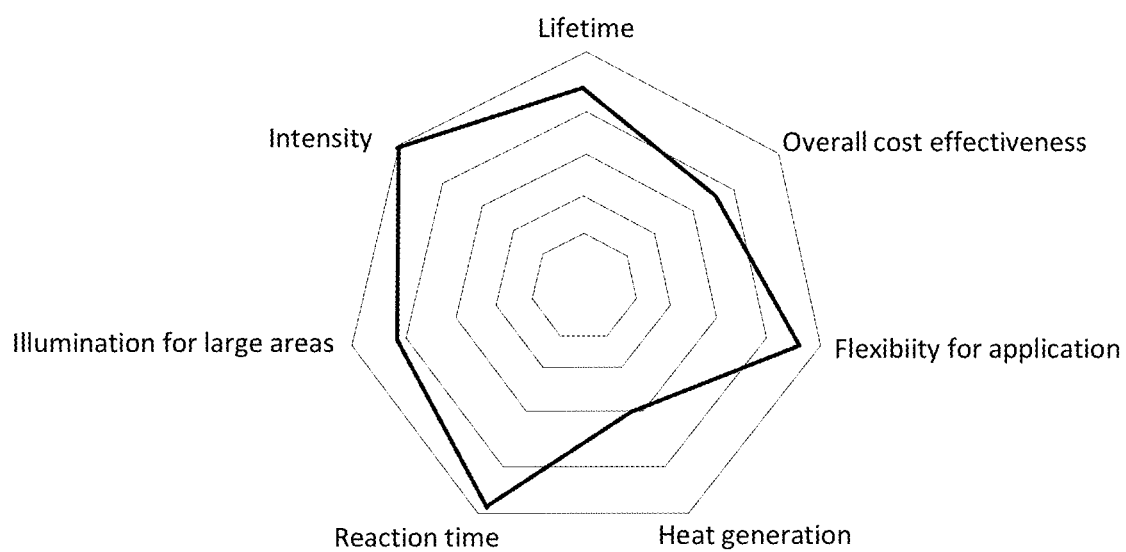
FIG. 23 illustrates LED light features for machine vision applications.

Today, LED lights cover a major part of industrial vision applications. LED light sources are highly preferred lighting sources for machine vision applications due to their unique features. LED provides high intensity illumination, low cost, flexibility, low heat generation, high reaction time and suitability of a variety lighting applications. FIG. 23 illustrates desired LED light features. Although LED is the most preferred lighting source for machine vision systems, during continuous operation, LEDs experience a gradual decrease in luminous flux, measured in Lumens. As a rule, this is accelerated by the operating current and temperature of the LED and also appears when the LED is driven within specifications.

The term "Lumen maintenance" is used in connection with the degradation of light in LEDs. This describes the remaining luminous flux over time, with respect to the original luminous flux of the LED. Due to continuous degradation, a failure criterion must be established in order to obtain a concrete evaluation of the LED failure. The point in time at which the luminous flux of the LED reaches the failure criterion is then described as the lifetime of the LED. As a rule, the failure criterion is determined by the application. Typical values are 50%(L50) or 70%(L70), depending on the market of the LED product.

For machine vision applications, especially in cosmetic defect detection and measurement, a small decay (around 10 to 15%) significantly affects the brightness and overall defect detection capability of image processing algorithms due to the fact that acquired images may not pick-up the small surface anomalies like fine scratches, micro cracks, dents and discoloration. Although calibration and auto recalibration take cares of re-establishing the original or best configuration of machine vision parameters, for performance and repeatability, it may not handle inherent decay of illumination of light source. This can be handled by practicing preventive and periodical maintenance of machine vision components.

Figure 24:
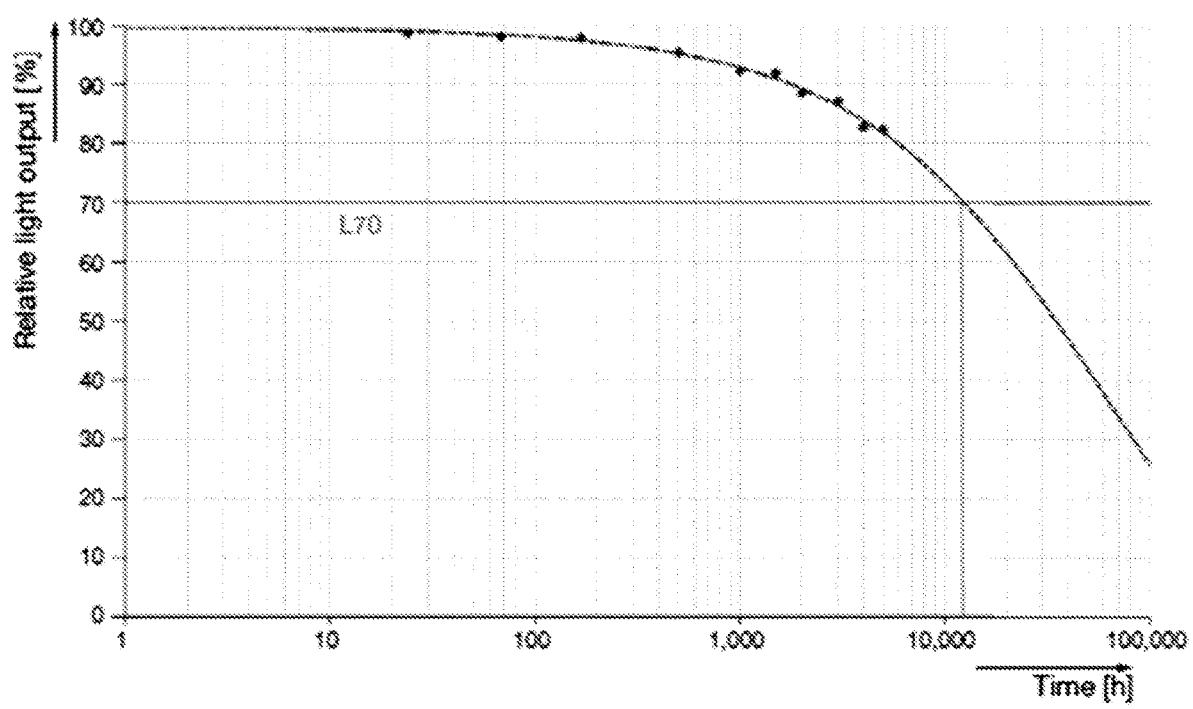
FIG. 24 illustrates a typical degradation curve of commercial LEDs

Currently, the preventive maintenance of an LED light source involves periodical change of light source based on permissible decay of luminescence value in percentage and the corresponding life of LEDs based on the decay curve supplied by LED supplier. It can be seen from FIG. 8 that the useful life of LED light source significantly reduces, for example at 30% decay the life of LED lights is considered as L70 which is equivalent to 10000 hours of operations whereas it will be just 1000 hours if the threshold luminescence decay of 10% i.e. L90. FIG. 24 illustrates a typical degradation curve of commercial LEDs.

Preventive maintenance procedures may be based on the assumption that the decay of LED luminescence exactly follows the degradation curve. In actuality there are several other parameters in the industrial environment that affect the performance of LEDs. Thus, periodical diagnostics of the light source becomes important. Presently the diagnostics of an LED lighting system is done by measuring the light intensities using light intensity meters externally. It is carried out during the scheduled maintenance cycle of system. It's a manual process to test and judge the remaining useful life of the light source and its subsequent replacement.

Automated Light Diagnostics and Predictive Maintenance

In order to avoid lengthy manual inspection and diagnostics of the light source an automated light diagnostics method is proposed. The method involves integration of light intensity sensors in the vision system, that programmatically measure the light intensity and automatically detect the percentage decay in illumination by comparing the original or best performance settings done during initial calibration of vision system parameters.

In a preferred embodiment, as can be seen in FIG. 22, in closed-loop machine vision system, a light intensity sensor is integrated. Similar to other vision system parameters, during the machine initial calibration the light intensities of each light strobing pattern is recorded and stored in the software program. A threshold of the luminescence value experimentally derived separately is also set during the initial calibration activity.

Figure 25:
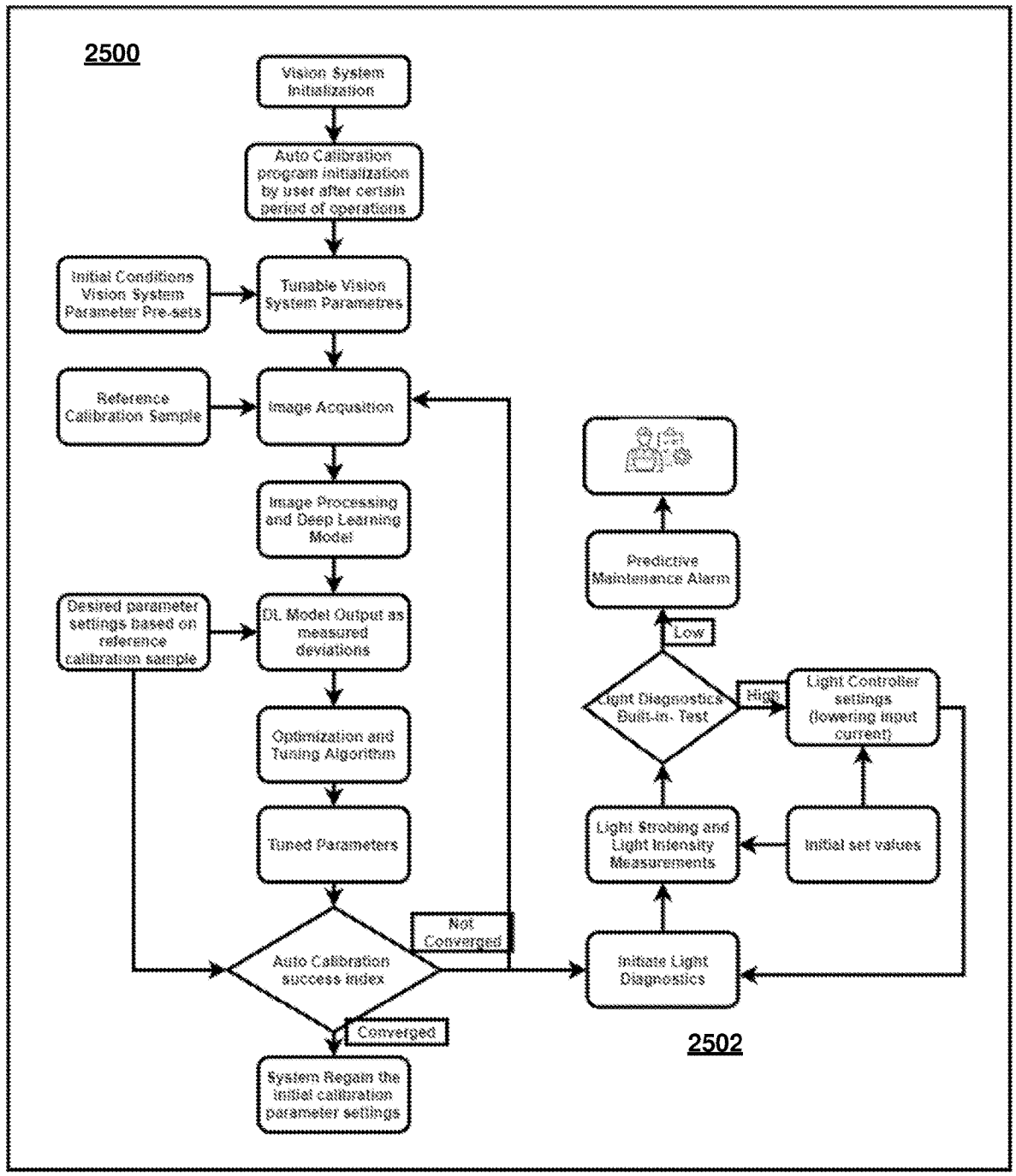
FIG. 25 illustrates an exemplary process flow for automatic light diagnostics built-in-testing.

FIG. 25 illustrates an exemplary auto light diagnostics built-in test flow 2502, which is further described below in Table 2.

TABLE 2

Auto-light diagnostics built-in test flow

1. After setting the machine for actual operation (2500), during the autocalibration process the image processing and deep learning algorithm analyses the acquired images 2514 of target calibration samples, fine tune the vision system parameter including the light parameters based on pixel-based reflected light intensities.
2. The auto calibration can be programmatically set during machine initialization after certain period of operations.
3. During the routine maintenance activities, while performing auto calibration procedure 2504-2528, the system collects light intensity values 2532 and the algorithm computes the percentage deviation in light intensity values with respect to initially set values 2532, 2534. If the deviation is more or less than the set threshold levels it initiates the parameter optimization program 2504-2528.
4. The optimization algorithms then initiate the vision system parameter tuning 2524 and try to reset its original or best possible configuration.
5. After programmatically iterating the fine tuning of vision parameters, if the system still detects the deviation with respect to the set light intensity values, the software initializes the automated light diagnostics program.
6. The software programmatically initiates the light strobing and simultaneously measures the light intensity values from light intensity sensors.
7. The built-in test program automatically compares the measured light intensities 2536 with set values and automatically generates an alarm if the measured values 2532 are below or above desired levels.
8. The alarm 2538 indicates the possible need of replacement of light source and the period remaining useful life much in advance so that the new light source can be procured and made available before actual replacement date.
9. Thus, the proposed automated diagnostics of light source provide predictive maintained requirements in real operating conditions than the preventive maintained which based on just an empirical calculation.

Hardware-In-Loop Deep-Learning Model Training Pipeline

The detection, identification, classification, analysis and measurement of cosmetic defects on smart phones is carried out using deep learning and image processing algorithms. These algorithms and their models are trained and validated on a set of image data captured during the development phase. The performance of the model for defect detection is greatly dependent on the surface variation in terms of surface finish, texture and color, which is dependent on material of construction. As long as the defects are visible in the captured images, the model can predict and classify all possible defects.

Following are the current limitations for manual training of deep learning and image processing algorithms. The performance of a machine vision system in terms of precision and repeatability for the inspection of surface defects is depends upon several factors, such as calibration of machine vision parameters, type of surface defects to be measured, types of objects including size and shape of object, color, material of construction and measurement accuracy of the vision sensor. The variation in type of object and type of surface defects on it varies a lot depending upon make, model, material, surface finish and its light reflection properties in various lighting conditions used with machine vision system The present AI, machine learning and deep learning technologies are based on historical data and data acquired for new devices during the development phase of the machine vision system.

During the development phase, the defect prediction model-performance is monitored manually by a deep learning engineer and the need of model training or retraining is decided by his or her best judgment. In real operations, it is a bit challenging and sometimes impossible to generate defect training data of all varieties and all surface characteristics. It is also true that new materials and new types of surface defect definition may emerge as per end user business requirements. The deep learning model training is a continuous and iterative process. For new types of surface features and new types of defect definitions models must be re-trained for new and untrained dataset of acquired images.

The current model training is a lengthy and laborious process where the well trained deep leaning engineer collects the untrained image data set, manually annotates the defects and re-trains the deep learning models that are subsequently able to detect, identify, classify and measure surface defects for new and untrained image data. The analysis of performance of deep learning models requires significant knowledge and experience to judge re-training requirements.

To productionize the machine vision operations, and establish true machine learning functionality, an automated model training or re-training process needs to be integrated with the machine vision system. This will eliminate the need of human intervention for model performance evaluation and decision-making regarding deep learning model training.

To eliminate the need of human intervention a human-like intelligence can be integrated in machine vision systems.

Automated Hardware-in-Loop Deep Learning Model Training Pipeline

Figure 26:
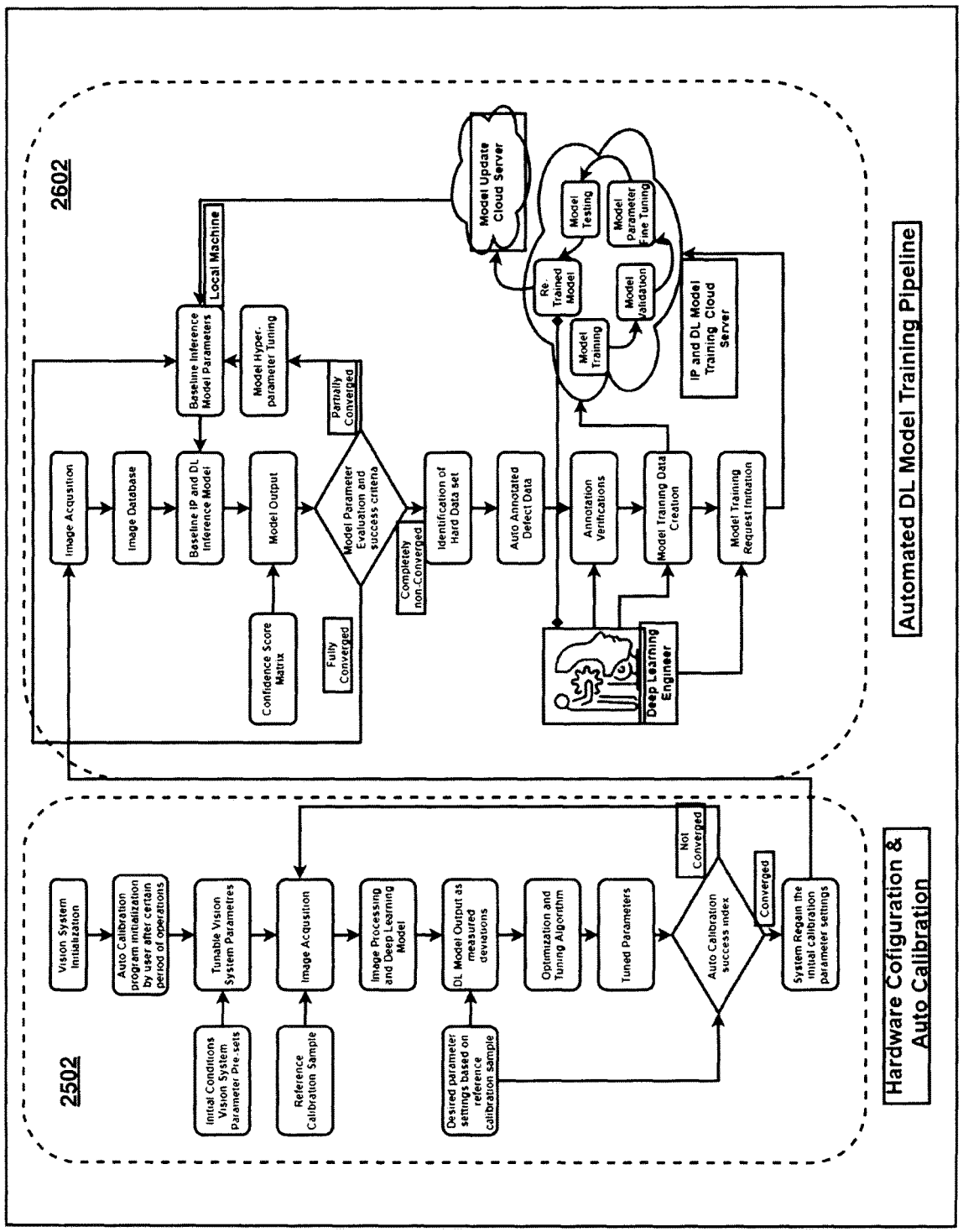
FIG. 26 illustrates a hardware-in-loop deep learning model training pipeline.

In a preferred embodiment, a hardware-in-loop deep learning model training pipeline is proposed. It comprises of a fully automated machine vison set-up as described above and in FIG. 22, and a cloud based deep learning model server and software update server. A fully automated vision system is capable of automated image acquisition, automated defect detection, classification and measurement functions based on pre-trained deep learning and image processing algorithm and automated grading of the object based on configurable cosmetic grading criteria. The vision system is pre-calibrated and is capable of auto-recalibrating its vision system parameters as explained above with respect to standard calibration sample. FIG. 26 shows a hardware-in-loop deep learning model training pipeline architecture.

The deep learning model training pipeline operation flow, FIG. 26, is explained as follows. The initial deep learning and image processing algorithm models were trained on a previously acquired image database (2500). The manually graded object image data is then manually annotated by an expert vision system team and a training database is created 2606. The models may be trained on a deep learning cloud server. The trained baseline models may then be validated on training data and tested on untrained data. The performance of the trained model is evaluated by a deep learning engineer. The trained inference models are then deployed in a machine vision system software program. This is a baseline version of deep learning and inference models. During the regular operations, new images will be acquired and analyzed, using baseline inference models. The pre-trained inference models can now compute the object's cosmetic grade based on pre-defined cosmetic grading criteria. The accuracy of model prediction performance can be evaluated with the help of a supervisory deep learning algorithm based on confidence score index computed by baseline inference models as described below.

A confidence score index may be computed in two ways. Using two different baseline inference deep learning models on a common image data set, the engineer performs evaluation of model performance. The agreement between each model prediction will decide the confidence score index. During the routine operation, if the prediction score is less than the computed confidence score index, the model must be re-trained with a new image dataset. For this re-annotation must be carried out manually for model re-training. The other way of arriving at a confidence score is applying two different biased models (different for different defect types) and analyze saturation and probability of prediction. The average probability of two models may be used to calculate a confidence score. Further, by using the confidence factor as a threshold value, if the prediction score is less than the threshold value, the data needs to be re-annotated manually and the model needs to be re-trained and deployed.

During the routine operations, the machine inference will take place as per the finalized baseline inference model 2608. The deep learning model will generate a confidence score for each prediction that is made. The cloud agent will monitor the transaction table for the cases of predictions which are below the confidence threshold. The list of the object tracking IDs of the predictions with low confidence will be generated and notified to the deep learning engineer (or the images of the devices will be synced on a specific drive). These hard cases will be passed for the annotation. The deep learning engineer will annotate the images (or verify the annotations done by the Annotation team) and upload the images to the deep learning training server. The deep learning engineer will monitor the deep learning training server for the model training and verify if the model is suitable to be updated on the machines. If the model is performing well on the hard cases and is validated by the deep learning engineer, then the model will be uploaded to the update server. The machines will update the model in the machine to the latest version.

The system and method disclosed herein comprises a computing device and various hardware component (i.e. positioning automation, cameras, lighting, sensor) subsystems, each with programmable controllers that provide the logic for each subsystem to perform its role in the system. Users may program the controllers by writing executable code on the computing device and transferring it to the controller.

A computing device 502 may also be referred to as a computer or server. Software applications, comprised of computer-executable instructions stored in non-transitory memory or non-transitory secondary storage for execution by a processor are operatively configured to perform the operations as described in the various embodiments. The software applications may correspond with a single module or any number of modules. Modules of a computer system may be made from hardware, software, or a combination of the two. Generally, software modules are program code or instructions for controlling a computer processor to perform a particular method to implement the features or operations of the system. The modules may also be implemented using program products or a combination of software and specialized hardware components. In addition, the modules may be executed on multiple processors for processing a large number of transactions, if necessary or desired.

Although the computer, computing device or server 502 has been described with various components, it should be noted that such a computer, computing device or server can contain additional or different components and configurations. In addition, although aspects of an implementation consistent with the system disclosed are described as being stored in memory, these aspects can also be stored on or read from other types of computer program products or computer-readable media, such as secondary storage devices, including hard disks, floppy disks, or CD-ROM; a non-transitory carrier wave from the Internet or other network; or other forms of RAM or ROM. Furthermore, it should be recognized that computational resources can be distributed, and computing devices can be client or server computers. Client computers and devices (e.g.) are those used by end users to access information from a server over a network, such as the Internet or a local area network. These devices can be a desktop or laptop computer, a standalone desktop, or any other type of computing device. Servers are understood to be those computing devices that provide services to other machines, and can be (but are not required to be) dedicated to hosting applications or content to be accessed by any number of client computers. Operations may be performed from a single computing device or distributed across geographically or logically diverse locations.

Communications between subsystems may be driven by computing device executable code by some type of interface, such as ethernet, Bluetooth, USB, or other connection. Remote access by customers or users may be provided by web services or networks. A computing device may transmit network-based services requests to external systems networks via external networks. In various embodiments, external networks may encompass any suitable combination of networking hardware and protocols necessary to establish network-based communications between clients and service provider network. For example, a network may generally comprise various telecommunications networks and service providers that collectively implement the Internet. A network may also include private networks such as local area networks (LANs) or wide area networks (WANs) as well as public or private wireless networks. For example, both a given client and service provider network may be provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a link between a client and the Internet as well as between the Internet and a service provider network. It is noted that in some embodiments, clients may communicate with server provider network using a private network rather than the public Internet.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, means, methods and steps described in the specification. As one of ordinary skill in the art will readily appreciate from the disclosure, processes, machines, manufacture, means, methods or steps presently existing or later to be developed that perform substantially the same function or achieve substantially the same result as the corresponding embodiments described herein may be utilized according to the present disclosure. Accordingly, the appended claims are intended to include within their scope such processes, machines, manufacture, means, methods or steps.

What is claimed is:

1. A computerized control system for autocalibration of a computer vision system, the computerized control system comprising:

a main computer comprising a processor and a memory including programs comprising instructions stored in the memory that when executed by the processor interface with a motion control unit to control the components of the computer vision system and a module comprising deep learning, optimization and image processing algorithms stored in the memory which when executed by the processor perform the following steps: (i) capture images following motion control adjustments to system components, (ii) collect measurements of the adjustments and quality data of resulting captured images and (iii) present the data to the deep-learning, optimization and image processing algorithms to determine and automatically set the optimal component features for vision tuning and (iv) instruct the motion control unit to make adjustments to the computer vision system components where adjustments include position and centering of an object in the workspace, lighting adjustments including illumination, direct/diffused light intensity and color, camera parameters including camera exposure time, gain and white balance, and resolution, and lens features including focal length, zoom and f-stopping; and the motion control unit comprising a motion control computer, motor drives and controls, capable of integration with a computer vision environment and operatively configured to control the position and features of components of the computer vision system, wherein the components of the computer vision system include the object mounting and manipulation in the workspace, lighting, camera parameters and lens components;

a user interface operatively configured to assist a user in viewing and maintaining the motion control unit and main computer.

2. The autocalibration system of claim 1, wherein the optimization techniques may be chosen from a group consisting of: (1) genetic algorithms, (2) particle swarm optimization, and (3) gradient descent methods.

* * * * *